US010899083B1

(12) United States Patent
Rice et al.

(10) Patent No.: US 10,899,083 B1
(45) Date of Patent: Jan. 26, 2021

(54) BONDED NUTPLATE RAPID CURE SYSTEM

(71) Applicant: Kineticure, LLC, Miamisburg, OH (US)

(72) Inventors: Jason P. Rice, Dayton, OH (US); Mark C. Cridge, Miamisburg, OH (US); Christopher D. Hemmelgarn, South Charleston, OH (US); Patrick J. Hood, Bellbrook, OH (US); Tat Hung Tong, Bellbrook, OH (US)

(73) Assignee: Kineticure, LLC, Miamisburg, OH (US)

( * ) Notice: Subject to any disclaimer, the term of this patent is extended or adjusted under 35 U.S.C. 154(b) by 1 day.

(21) Appl. No.: 16/163,179

(22) Filed: Oct. 17, 2018

Related U.S. Application Data

(60) Provisional application No. 62/649,649, filed on Mar. 29, 2018.

(51) Int. Cl.
*F16B 11/00* (2006.01)
*F16B 37/04* (2006.01)
(Continued)

(52) U.S. Cl.
CPC ...... *B29C 65/7838* (2013.01); *B29C 65/7844* (2013.01); *B29C 65/8261* (2013.01);
(Continued)

(58) Field of Classification Search
CPC ...... F16B 11/006; F16B 11/008; F16B 37/04; F16B 37/044; F16B 37/048; F16B 17/006;
(Continued)

(56) References Cited

U.S. PATENT DOCUMENTS 5,013,391 A * 5/1991 Hutter, III ......... B05C 17/00503
156/578
5,197,839 A * 3/1993 Willey ..................... B21J 15/42
411/103
(Continued)

FOREIGN PATENT DOCUMENTS

EP 744555 A1 * 11/1996 ............. F16B 37/04

OTHER PUBLICATIONS

Rumble, John R. ed., "Thermal Conductivity of Alloys as a Function of Temperature," CRC Handbook of Chemistry and Physics, 100th Edition (Internet Version 2019), CRC Press/Taylor & Francis. http://hbcponline.com/faces/documents/12_30/12_30_0001.xhtml (Year: 2019).*
Rumble, John R. ed., "Thermal Conductivity of Alloys as a Function of Temperature," CRC Handbook of Chemistry and Physics, 100th Edition (Internet Version 2019), CRC Press/Taylor & Francis. http://hbcponline.com/faces/documents/12_30/12_30_0001.xhtml.*

(Continued)

*Primary Examiner* — Michael A Tolin
*Assistant Examiner* — Brian R Slawski
(74) *Attorney, Agent, or Firm* — Dinsmore & Shohl LLP

(57) ABSTRACT

Systems for positioning and bonding a nutplate to a substrate having an aperture include a nutplate engagement fixture and a temperature sensor retention fixture. The nutplate engagement fixture includes a rigid tube and an elastomeric tube engaged with the rigid tube, the elastomeric tube having an elongated tube sized to provide a friction fit with the aperture and retain the elastomeric tube within the aperture. The rigid tube is operable to engage the nutplate at one end and the elastomeric tube is configured to anchor the nutplate engagement fixture at the aperture and secure the nutplate in contact with the substrate. The temperature sensor retention fixture includes a fixture body sized and configured to engage with the nutplate and at least one passageway within the fixture body sized and configured to allow a temperature sensor to be inserted or embedded therein with an end proximal a surface of the nutplate.

8 Claims, 13 Drawing Sheets

(51) Int. Cl.
*B29C 65/00* (2006.01)
*B29C 65/48* (2006.01)
*B29C 65/56* (2006.01)
*B29C 65/72* (2006.01)
*B32B 37/00* (2006.01)
*B32B 1/08* (2006.01)
*B29C 65/78* (2006.01)
*B29C 65/82* (2006.01)
*B29L 23/00* (2006.01)

(52) U.S. Cl.
CPC ........ *B29C 65/4835* (2013.01); *B29C 65/561* (2013.01); *B29C 65/565* (2013.01); *B29C 65/72* (2013.01); *B29C 66/301* (2013.01); *B29C 66/3032* (2013.01); *B29C 66/5221* (2013.01); *B29C 66/712* (2013.01); *B29C 66/742* (2013.01); *B29L 2023/003* (2013.01); *B32B 1/08* (2013.01); *B32B 2597/00* (2013.01)

(58) Field of Classification Search
CPC ....... B29C 65/00; B29C 65/48; B29C 65/483; B29C 65/4835; B29C 65/56; B29C 65/561; B29C 65/562; B29C 65/565; B29C 65/64; B29C 65/72; B29C 66/00; B29C 66/301; B29C 66/303; B29C 66/3032; B29C 66/40; B29C 66/41; B29C 66/45; B29C 66/47; B29C 66/472; B29C 66/474; B29C 66/50; B29C 66/5221; B29C 66/712; B29C 66/74; B29C 66/742; B29C 66/7422; B29C 66/74281; B29C 66/74283; B29C 66/1121; B29C 66/5344; B29L 2023/00; B29L 2023/001; B29L 2023/003; B29L 2023/22; B32B 1/08; B32B 2597/00
USPC .. 156/60, 64, 66, 71, 91, 92, 293, 294, 296, 156/349, 350, 367, 378, 391, 423; 29/282, 525.01, 525.02, 525.13, 700; 411/82, 82.2, 103, 172, 907; 428/34.1, 428/34.9, 35.7, 35.8, 36.8, 36.9, 36.91
See application file for complete search history.

(56) References Cited

U.S. PATENT DOCUMENTS

| | | | | |
|---|---|---|---|---|
| 5,704,747 A * | 1/1998 | Hutter, III | ............ | F16B 37/044 411/113 |
| 2003/0091408 A1* | 5/2003 | Toosky | ................... | B23P 9/025 411/181 |
| 2006/0075617 A1* | 4/2006 | Toosky | ................... | B21J 15/50 29/256 |
| 2007/0048107 A1* | 3/2007 | Johnson | ................... | B23P 9/025 411/113 |
| 2007/0141289 A1* | 6/2007 | Hutter, III | ............ | F16B 11/006 428/40.1 |
| 2007/0224016 A1* | 9/2007 | Toosky | ................... | F16B 37/044 411/108 |
| 2008/0101888 A1* | 5/2008 | Toosky | ................. | F16B 17/006 411/108 |
| 2009/0126180 A1* | 5/2009 | Keener | ................... | F16B 19/06 29/505 |
| 2010/0166523 A1* | 7/2010 | Roosa | ................... | F16B 37/044 411/82 |
| 2011/0150599 A1* | 6/2011 | Bakken | ................. | F16B 17/006 411/183 |
| 2011/0182692 A1* | 7/2011 | Reid | ....................... | B23P 9/025 411/176 |
| 2014/0161556 A1* | 6/2014 | Toosky | .............. | F16B 19/1081 411/44 |
| 2015/0368823 A1* | 12/2015 | Curran | ................... | C25D 11/26 205/50 |
| 2017/0339749 A1* | 11/2017 | Hutter, III | ............. | F16B 11/006 |
| 2018/0266461 A1* | 9/2018 | Cheynet De Beaupre | ................... | F16B 5/01 |

OTHER PUBLICATIONS

Click Bond "Nutplates", http://www.clickbond.com/products/nutplates/.
Click Bond, "Click Bond Nutplate/Hysol 9309.03 Installation and Removal Procedure", ftp://sidads.colorado.edu/pub/DATASETS/nsidc0587_ICESAT_GLAS_LTA/Section1_Preflight-Pre-Operations%20Calibration/Click%20Bond%20Nutplate,%20Install%20and%20Removal.pdf, Released by GLAS CMO Dec. 9, 2002.

* cited by examiner

BONDED NUTPLATE RAPID CURE SYSTEM

CROSS-REFERENCE TO RELATED APPLICATIONS

This application claims priority to U.S. Provisional Application 62/649,649 filed Mar. 29, 2018, which is incorporated by reference herein in its entirety.

STATEMENT REGARDING FEDERALLY SPONSORED RESEARCH OR DEVELOPMENT

This invention was made with Government support under Contract Numbers FA8650-16-M-5062 and FA8650-17-C-5068 awarded by the U.S. Air Force Materiel Command to Cornerstone Research Group Inc. The Government has certain rights in the invention.

TECHNICAL FIELD

Embodiments described herein relate generally to rapid curing systems for bonding hardware to substrates or substructures and the associated instrumentation and fixtures.

BACKGROUND

Adhesively bonded hardware, which are fasteners such as nutplates, bushings, threaded inserts, sleeves, mounts, brackets, etc., are commonly used to secure structural elements during installation or repair. Bonded hardware is used on variety of systems including: aircraft, spacecraft, watercraft, automobiles, and industrial equipment. Adhesively bonded hardware is also used to join components of dissimilar materials or when welding or riveting is not an option. Bonded hardware typically experiences failure in the form of mechanical wear, structural deformation, or separation of the hardware from the mounting substrate (i.e., disbond).

Damaged hardware found during routine maintenance requires timely replacement and approved repair techniques often mandate the use of certified adhesives. Unfortunately, approved repair adhesives are typically those used during original factory installation. Approved hardware adhesives are generally two-part epoxies whose performance specifications are determined by a lengthy cure (e.g. 24 hour) at room temperature. This specific curing time is necessary for the adhesive to develop the strength required to hold the hardware in place for attaching other components (e.g., reattaching an access panel to an aircraft). This long cure time can negatively impact the system's availability.

In the aerospace industry, nutplates are commonly used to attach to aircraft panels. In this case, the 24 hour curing time is highly problematic, because this long cure time can negatively impact the aircraft's availability. To expedite nutplate repair processes, supplemental heating has been considered in order to accelerate the curing rate of adhesives. However, the accelerated cure profile must be well controlled to achieve desired adhesive properties (e.g., tensile strength, shear strength, peel strength, etc.) and nutplate load ratings (e.g., push-out force and maximum torque) while also preventing damage to the surrounding structure due to excessive temperature exposure. Moreover, the delivery of heat to the bonded nutplate area poses issues, because delivering heat in an aircraft environment with flammable liquids or vapors present is a potential safety hazard.

Accordingly, there is a need for improved bonded hardware cure systems capable of delivering heat to specific localized areas to reliably and safely reducing the adhesive cure time.

SUMMARY

Embodiments of the present disclosure meet those needs by providing a bonded hardware rapid cure system that applies localized heating through the body of the hardware and into the adhesive bondline at a bonding surface. More specially, the hardware that can benefit from the use of the currently disclosed rapid cure system to adhesively bond with a structure is a nutplate. By significantly reducing the cure time for nutplate bonding in an aircraft panel, the present systems and methods minimize the time for nutplate installations and repair, thus increasing aircraft production rate in manufacture and reducing the unavailability for an aircraft during maintenance. In addition, the currently disclosed system also allows better control of the cure temperature at the bondline and the bonding surface of the nutplate, leading to improved consistency of the adhesive cure and bonded nutplate performance.

According to one embodiment of the present disclosure, a nutplate engagement fixture for temporarily securing a nutplate in a system for positioning and bonding a nutplate to a substrate comprising at least one aperture is provided. The nutplate engagement fixture comprises a rigid tube comprising a first section having a first diameter and a second section having a second diameter, the first diameter being greater than the second diameter. The nutplate engagement fixture further comprises an elastomeric tube engaged with the rigid tube at the second section of the rigid tube, the elastomeric tube comprising an elongated tube with an external diameter sized to provide a friction fit with the aperture and retain the elastomeric tube within the aperture. The rigid tube is operable to engage the nutplate at one end and extend through the aperture of the substrate. Further, the elastomeric tube is configured to anchor the nutplate engagement fixture at the aperture and secure the nutplate in contact with the substrate.

According to a further embodiment, a temperature sensor retention fixture for temporarily securing at least one temperature sensor to a nutplate in a system for positioning and bonding a nutplate to a substrate comprising at least one aperture is provided. The temperature sensor retention fixture comprises a fixture body sized and configured to engage with the nutplate and at least one passageway provided within the fixture body of the temperature sensor retention fixture. The passageway is sized and configured to allow a temperature sensor to be inserted or embedded therein with an end of the temperature sensor positioned proximal a surface of the nutplate.

These and other embodiments are described in more detail in the following Detailed Description.

BRIEF DESCRIPTION OF THE DRAWINGS

The following detailed description of specific embodiments of the present disclosure can be best understood when read in conjunction with the following drawings, where like structure is indicated with like reference numerals.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Embodiments of the present disclosure are directed to systems for positioning and bonding a nutplate to a substrate and methods that apply localized heating through the body of the nutplate and into the bonding surface (i.e., the adhesive bondline between a substrate and nutplate) to accelerate the cure time required to securely bond the nutplate onto the substrate and the associated instrumentation and fixtures. Bonding surface may alternatively be referenced as the bondline or adhesive bondline. As used herein, "localized heating" means focused heating directed to the bonding surface, and limiting heating of the surrounding environment, particularly the surrounding substrate, by placing the heating component in direct contact with the heat conducting metal of the nutplate. The direct contact with the heat conducting metal of the nutplate allows efficient heat transfer through conduction to the adhesive bonding surface of the nutplate. For illustration, we have included a discussion of embodiments of the system for positioning and bonding a nutplate to a substrate, specifically, systems wherein nutplates are adhered to panels (e.g., aircraft panels).

Figure 1:
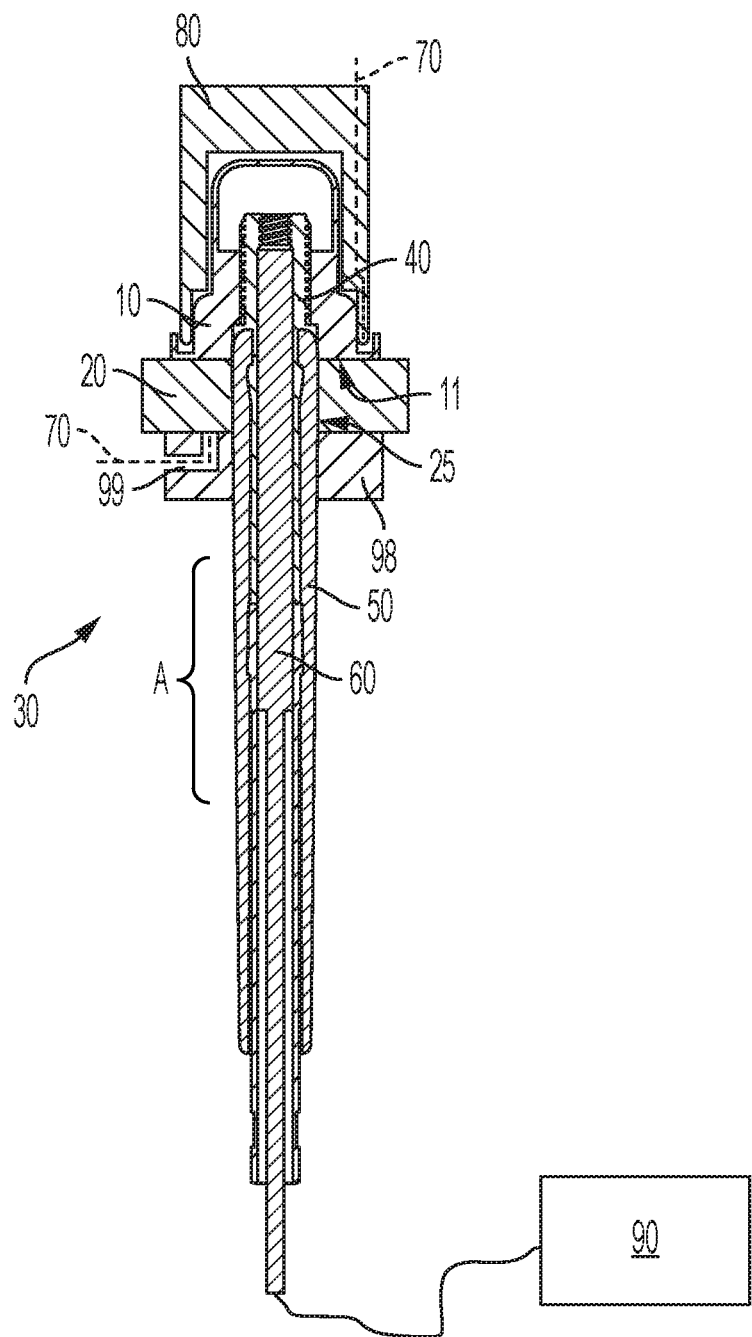
FIG. 1 is a cross sectional view of a system for positioning and bonding a nutplate to a substrate comprising at least one aperture according to one or more embodiments of the present disclosure.

Referring to the embodiment of FIG. 1, a nutplate retention system 5 for securing a nutplate 10 to a substrate is depicted. The depicted substrate is a panel 20. The nutplate retention system 5 enables application of localized heating to accelerate the curing rate of the adhesively bonded nutplates. Specifically, focused heating is directed to the bonding surface 11 (i.e. the adhesive bondline between the nutplate 10 and the panel 20) via the metal nutplate, and heating of the surrounding environment and particularly the substrate is limited by placing the heating component in the interior of a tube that is in direct contact with the metal nutplate. The positioning of the heating element allows efficient heat transfer through heat conduction to the bonding surface 11 to cure the adhesive and bond the nutplate 10 to the panel 20. Alternate non-localized heating methods, such as the use of electric heating blanket, hot air with heat gun, and inductive heating on hardware on a metal substructure, will likely result in excessive or non-localized heating of the panel 20 or substructure, which may continue to transfer heat into the adhesive at the bonding surface 11 after a desirable cure state of the adhesive is achieved. The continued transfer of heat into the adhesive at the bonding surface 11 may result in undesirable adhesive or substructure material properties (i.e. overcuring of adhesive). In addition, operating these alternate heating methods is especially challenging when there is limited space or access to the back side portion of the structure where the nutplate 10 will reside during installation or repair, since the equipment needed for the alternate methods are generally bulky and may not be compatible with the limited space available. Furthermore, the use of non-localized heating may cause potential safety hazard in an environment that has ignitable organic vapor. Also, heating directly on the outer surface of the panel opposing the nutplate 10 to raise the bonding surface 11 temperature may require excessive heating to achieve sufficient heat transfer through the panel 20. In addition, such approach may not be feasible as the outer surface may be formed from a composite panel with low thermal conductivity.

Figure 15:
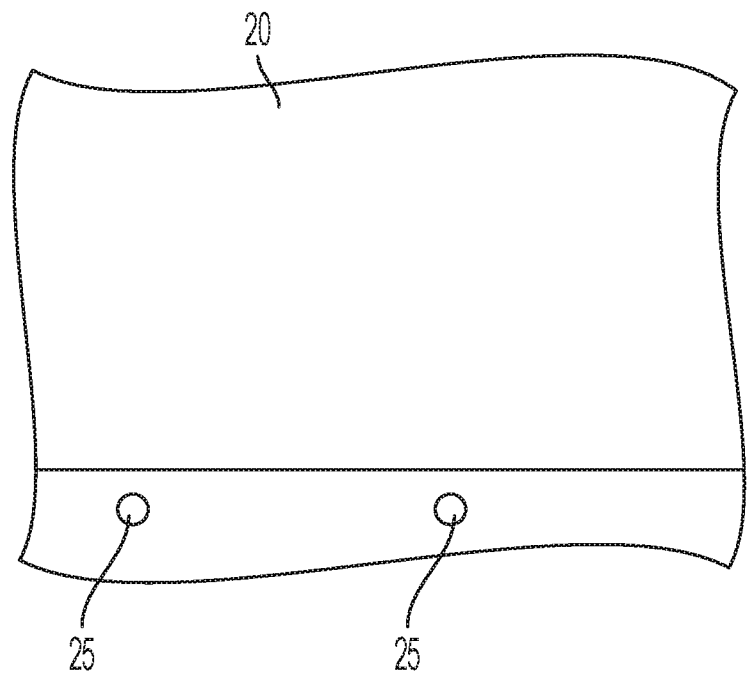
FIG. 15 is a schematic view of a panel having an aperture for subsequent attachment to the nutplate according to one or more embodiments of the present disclosure.
Figure 16:
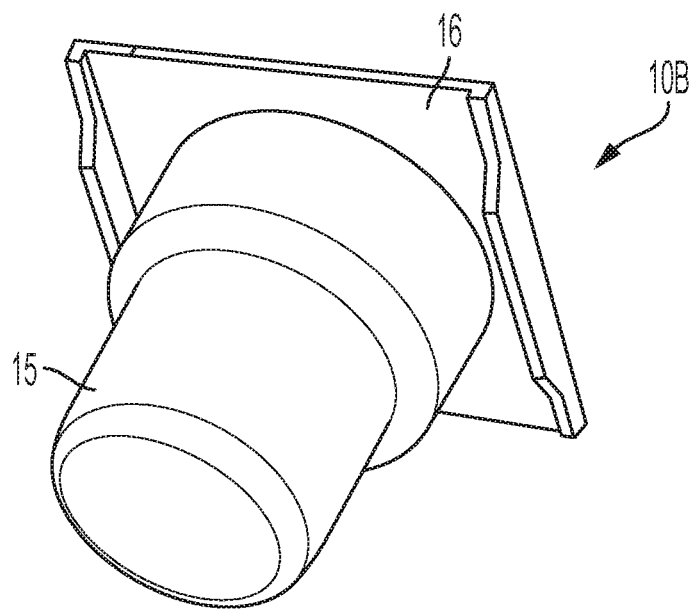
FIG. 16 is a schematic view of the outer surface of a dome style nutplate utilized in a system for positioning and bonding a nutplate to a substrate comprising at least one aperture according to one or more embodiments of the present disclosure.

As shown in FIG. 1 the panel 20 comprises at least one aperture 25. Multiple apertures 25 are contemplated as shown in the embodiment of FIG. 15. Moreover, various materials are considered suitable for the panel 20. For example and not by way of limitation, the panel 20 may comprise ceramic, metal, plastic, aluminum, titanium, fiber reinforced polymer matrix composite, ceramic matrix composite, or combinations thereof. The panel 20 may comprise two different material layers fastened together to form a single panel.

Referring to the embodiments of FIGS. 4B, 7A, 14, and 17, the nutplate 10 comprises a substantially U-shaped profile with an open top to form an open style nutplate 10A. The substantially U-shaped profile of the open style nutplate 10A is formed from an open style nutplate flat region 12 and two parallel flanges 14. In one embodiment, the open style nutplate 10A comprise a threaded hole 17 within the floating nut element 19 centrally located on the open style nutplate flat region 12.

Referring to the embodiments of FIGS. 1, 8A, 8B, 9A, 9B, and 16, the nutplate 10 comprises a domed region 15 to form a dome style nutplate 10B. The dome style nutplate 10B may also comprise a dome style nutplate flat region 16 adjacent the domed region 15 of the dome style nutplate 10B. Further, the dome style nutplate 10B comprise a threaded hole 17 centrally located on the dome style nutplate flat region 16 and disposed within the domed region 15.

The open style nutplate flat region 12 of the open style nutplate 10A or the dome style nutplate flat region 16 of the dome style nutplate 10B may serve as the bonding surface 11 for the open style nutplate 10A or the dome style nutplate 10B respectively.

Various adhesives are considered suitable in the present embodiments, such as epoxy adhesives, acrylic adhesives, polyurethane adhesives or other adhesives known to the person skilled in the art.

Referring to FIG. 1, the nutplate retention system 5 comprises a nutplate engagement fixture 30. The nutplate engagement fixture comprises a rigid tube 40 and an elastomeric tube 50. The rigid tube 40 is operable to engage the nutplate 10 at one end and extend through one aperture 25 of the panel 20. The elastomeric tube 50 is engaged with the rigid tube 40 and configured to anchor the nutplate engagement fixture 30 at the aperture 25 and secure the nutplate 10 in contact onto the panel 20.

Additionally, the nutplate retention system 5 comprises a heater 60 that delivers heat to the bonding surface 11 of the nutplate 10 to accelerate the cure of adhesive. In one or more embodiments, the heater 60 is operable to be coaxially disposed within the nutplate engagement fixture 30. Without being bound by theory, placing the heater 60 in contact with the interior surface of the rigid tube 40 of the nutplate engagement fixture 30 enables heat to be locally delivered to the adhesive between the nutplate 10 and panel 20 at the bonding surface 11 via heat conduction through the nutplate 10. By providing localized heat to the bonding surface 11, the concerns of providing heat in environments with flammable liquids or vapor is reduced or eliminated.

With continued reference to FIG. 1, the nutplate retention system 5 also comprises at least one temperature sensor 70 operable to measure the temperature of the bonding surface 11 of the nutplate 10. In one embodiment, the temperature sensor is a thermocouple. In another embodiment, the temperature sensor is a thermistor or resistance temperature detector (RTD). The at least one temperature sensor 70 may be retained in position with a temperature sensor retention fixture 80. The temperature sensor retention fixture 80 is operable to position and secure the at least one temperature sensor 70 to the nutplate 10 during the cure.

The nutplate retention system 5 also comprises a heater controller 90 operable to control the output from the heater 60. The heater controller 90 may receive input signals from the at least one temperature sensor 70 and adjust the output from the heater 60 to achieve or maintain a desired temperature at the bonding surface 11 of the nutplate 10.

Having introduced various components of the nutplate retention system 5, each component will be described and disclosed in further detail and as various embodiments.

Figure 2:
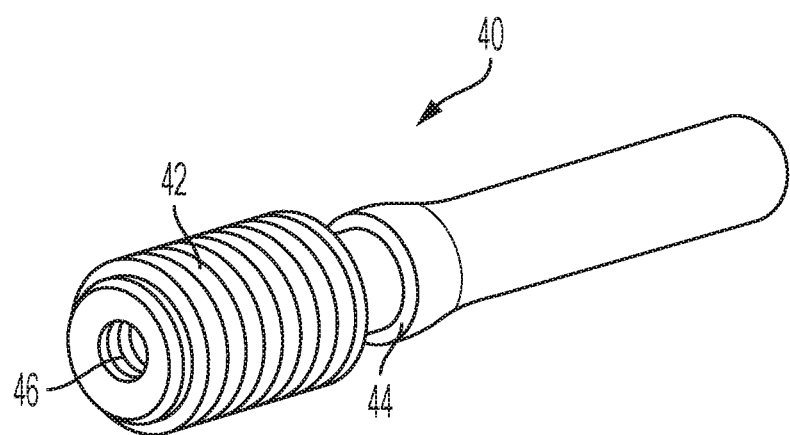
FIG. 2 is a schematic view of a rigid tube of a system for positioning and bonding a nutplate to a substrate comprising at least one aperture according to one or more embodiments of the present disclosure.
Figure 3:
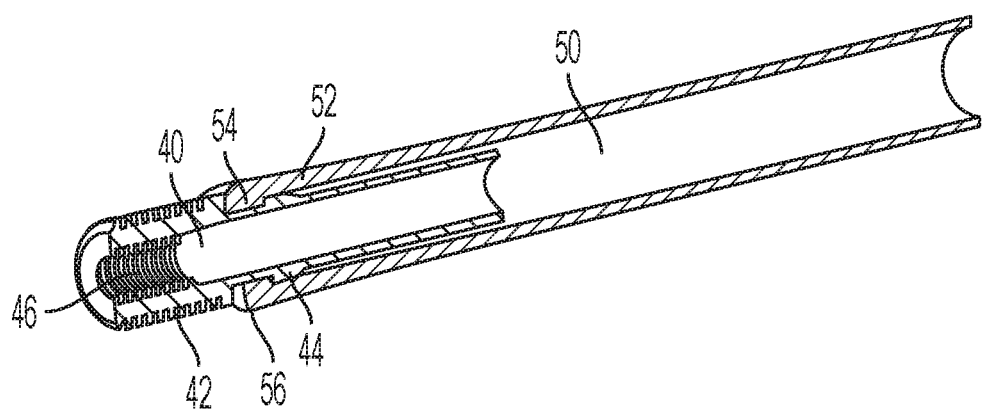
FIG. 3 is a cross sectional view of a nutplate engagement fixture of a system for positioning and bonding a nutplate to a substrate comprising at least one aperture according to one or more embodiments of the present disclosure.

The rigid tube 40 provides an engagement with the nutplate 10 to allow the nutplate 10 to be positioned and restrained against the panel 20 by the nutplate engagement fixture 30 during adhesive bonding of the nutplate 10 and the panel 20. With reference to FIGS. 2 and 3, the rigid tube may comprise a first section having a first diameter and a second section having a second diameter, where the first diameter is greater than the second diameter. The first section having the first diameter may comprise external threads 42 to form an externally threaded section. The external threads 42 may be sized and configured to mate with the threaded hole 17 of the nutplate 10. It will be appreciated that while aircraft typically have nutplate sized from 3/16 inch to 1/2 inch. As such, embodiments of the present disclosure may be configured to engage with nutplate sized at 3/16 inch, 1/4 inch, 3/8 inch, or 1/2 inch, for example.

The rigid tube 40 may also comprise an elastomeric tube retention shoulder 44 positioned on the second section. The elastomeric tube retention shoulder 44 comprises a circumferentially disposed lip on the exterior surface of the rigid tube 40 sized and configured to interface with a corresponding circumferentially disposed lip on the interior surface of the elastomeric tube 50.

In one or more embodiments, the rigid tube 40 comprises an internally threaded section with internal threads 46. The internal threads 46 are positioned proximal the end of the rigid tube 40 in the first section in a position concentric to the external threads 42. The internal threads 46 may be provided with an opposite handedness as those of the external threads 42. Specifically, the external threads 42 may be provided with the more common right-handed threads and the internal threads 46 may be provided with left-handed threads.

Opposite handedness threads aid in the safe removal of a threaded insert (e.g. the rigid tube 40) from bonded hardware (e.g. the nutplate 10) after securement of the bonded hardware is completed. A threaded removal tool, with a thread direction matching the threaded insert's internal threads, can be installed into the threaded insert. As the threaded installation tool engages the threaded insert and begins to generate torque on the threaded insert, the threaded insert is simultaneously removed from the bonded hardware by disengaging the threaded insert's external threads. These design features ensure the threaded insert remains attached to the removal tool and does not become foreign object debris (FOD).

As used herein, "rigid tube" means an inflexible material and is in contrast to the rubbery "elastomeric tube" as described below. In addition, the rigid tube may be open at both ends or may have the first section with external threads being a closed end. In one or more embodiments, the rigid tube 40 comprises a material with good thermal conductivity. In one or more embodiments, the rigid tube 40 comprises a thermally conductive material with good thermal conductivity. Such thermally conductive material may be metal or ceramic. For purposes of this disclosure, good thermal conductivity is considered to be in excess of 20 W/mK. In various embodiments the thermal conductivity of the rigid tube may be from 20-200 W/mK, from 50-200 W/mK, at least 50 W/mK, and at least 100 W/mK. Various metals are contemplated as suitable, for example, aluminum, copper, or stainless steel. Various ceramic are contemplated as suitable, for example, silicon carbide, aluminum nitride, or magnesium oxide.

The elastomeric tube 50 is engaged with the rigid tube 40 and provides a resistance fit with the aperture 25 of the panel 20 to secure the nutplate 10 in contact with the panel 20 and secure the heater 60 in contact with the nutplate 10. With reference to FIG. 3, the elastomeric tube 50 comprises an elongated tube with an internal diameter sized to retain the heater 60 and an external diameter sized to provide a friction fit with the aperture 25 and retain the elastomeric tube 50 in position.

In one or more embodiments, the external diameter of the elastomeric tube 50 varies along a longitudinal length. Specifically, the elastomeric tube 50 may comprise a flared section 52 with an increased external diameter. The flared section 52 may be disposed proximal the end of the elastomeric tube 50 configured for engagement with the rigid tube 40. The flared section 52 provides a compressive force and/or friction fit with the aperture 25 when the elastomeric tube 50 is inserted therein to engage the nutplate engagement fixture 30 with the nutplate 10.

In one or more embodiments, the elastomeric tube 50 comprises a retention lip 54. The retention lip 54 comprises a section of reduced diameter on the interior surface of the elastomeric tube 50 sized and configured to interface with the elastomeric tube retention shoulder 44 on the exterior surface of the rigid tube 40.

In one or more embodiments, the elastomeric tube 50 may comprise a boss 56 positioned at the end of the elastomeric tube 50 engaged with the nutplate 10. Specifically, the boss 56 provides a sealing interface between the elastomeric tube 50, the bonding surface, and the nutplate 10 to prevent adhesive migration into the threaded hole and onto the internal threads of the nutplate 10. The boss 56 may extend into the threaded hole 17 of the nutplate 10, such that a barrier is provided between a first interface of the bonding surface 11 and a second interface of the rigid tube 40 and the internal threads of the nutplate 10. In addition, it also provide a barrier between the bonding surface 11 and the aperture 25 of the panel 20 to prevent adhesive migration into the aperature 25.

Various materials are contemplated for the elastomeric tube 50 as depicted in at least FIGS. 1 and 3. These materials may include thermoplastic elastomer, thermosetting elastomer, or combinations thereof. For example and not by way of limitation, the elastomer may include one or more components selected from silicone rubber, polyurethane elastomer, fluoroelastomer, and perfluoroelastomer.

Figure 4A:
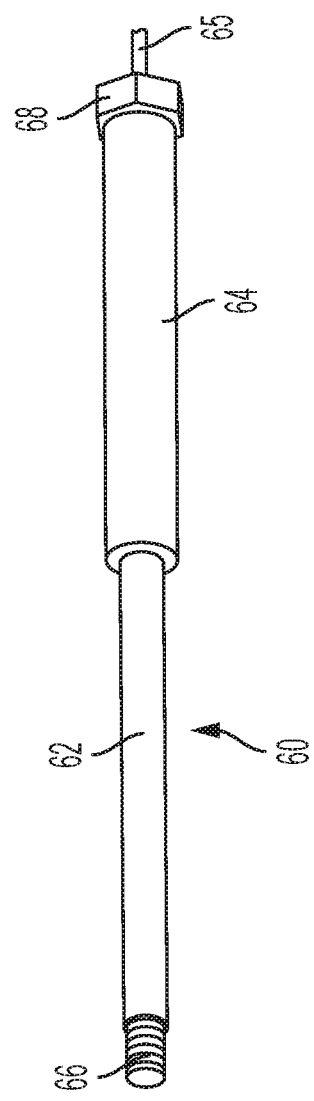
FIG. 4A is a schematic view of a heater of a system for positioning and bonding a nutplate to a substrate comprising at least one aperture according to one or more embodiments of the present disclosure.
Figure 4B:
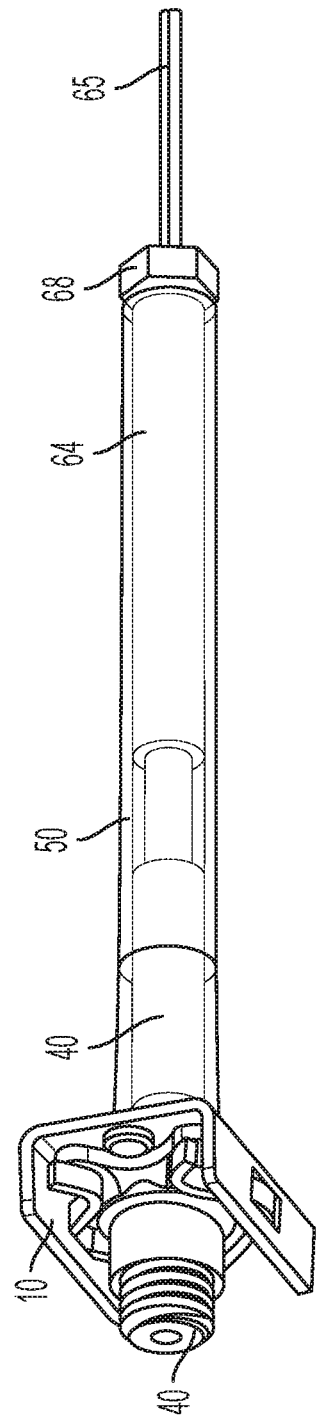
FIG. 4B is a transparent view of a portion of a system for positioning and bonding a nutplate to a substrate comprising at least one aperture according to one or more embodiments of the present disclosure illustrating positioning of the heater.

The heater 60 may encompass various embodiments. In one embodiment, the heater 60 comprises a joule heating element resided within a thermally conductive cartridge 62. Various materials are contemplated for the joule heating element, such as a nichrome wire. Additionally as shown in FIGS. 1, 4A, and 4B, the heater 60 may comprise a joule heating element resided within a thermally conductive cartridge 62 connected to power leads 65, which are connected to a power source. Various materials have been contemplated for the thermally conductive cartridge 62, including metal such as stainless steel, copper and aluminum, and ceramic such as silicon carbide, aluminum nitride and magnesium oxide. Any suitable power source that may deliver current is contemplated. The power leads 65 deliver current to the joule heating element within the thermally conductivecartridge 62, which then produces the heat used to accelerate the adhesive curing and bonding of the nutplate 10 to the panel 20.

The heater 60 may be retained in the nutplate engagement fixture 30 with a variety of mechanisms. Specifically, the heater 60 is operable to deliver heat to the bonding surface 11 of the nutplate 10 and is retained in a coaxially alignment within the nutplate engagement fixture 30. With reference to FIGS. 4A and 4B, in one or more embodiments, the heater 60 comprises a heater extension 64. The heater extension 64 increases the longitudinal length of the thermally conductive cartridge 62 that contains the joule heating element. The heater extension 64 may be affixed to the thermally conductive cartridge 62 with an adhesive, welding, or other securement method. The heater extension 64 may also be machined as an integral part of the thermally conductive cartridge 62. The heater extension 64 allows the heater 60 to be accessed by an installation tool without interference from the elastomeric tube 50. Specifically, heater extension 64 provides access to manipulate the thermally conductive cartridge 62 such that it may be threaded it into the rigid tube 40 when the heater 60 is positioned inside the elastomeric tube 50.

The threaded region 66 may be provided with threads matching the size, handedness, and pitch of the internal thread 46 of the rigid tube 40. As such, the heater 60 may be threadibly engaged with the rigid tube 40 to secure and retain the heater 60 in position for adhesive curing and bonding of the nutplate 10 to the panel 20. In addition, the threadibly engaged interface provides efficient heat transfer between the heater 60 and the rigid tube 40. Further, the heater extension 64 may comprise a hex head 68 or other non-circular geometry to interface with a tool to allow rotational manipulation of the heater 60 into the rigid tube 40 and subsequent removal. The tool may be a standard wrench or may comprise a custom wrench with a central bore allowing passage of the power leads 65 there through during manipulation.

In various embodiments, the heater 60 is removable from the nutplate engagement fixture 30. In one embodiment, the heater 60 is a cartridge heater, which comprises a heating element within an enclosed heat conducting cartridge. Additional material such as thermal grease may be applied to the interface between the heater 60 and the inside of the rigid tube 40 to increase the efficiency of heat transfer between the two components.

Figure 5:
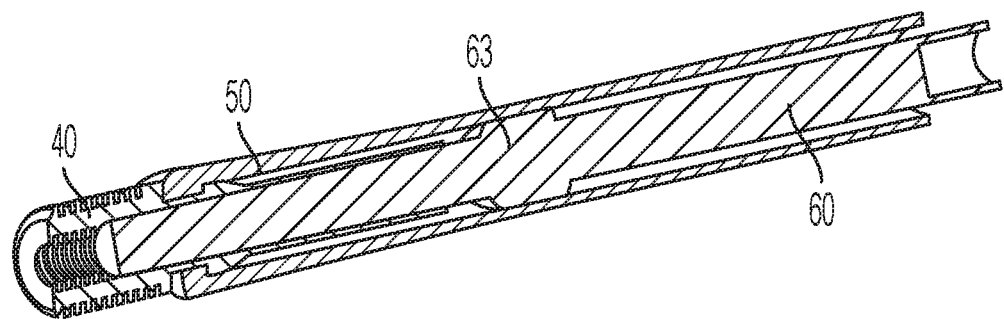
FIG. 5 is a cross sectional view of the heater disposed in the nutplate engagement fixture of a system for positioning and bonding a nutplate to a substrate comprising at least one aperture according to one or more embodiments of the present disclosure.

With reference to FIG. 5, in one or more embodiments, the heater 60 is retained in the nutplate engagement fixture 30 by a shoulder 63 on the heater 60 providing an area of increased diameter for engagement with the elastomeric tube 50. The shoulder 63 provides a resistance or friction fit against the elastomeric tube 50 as the diameter of the shoulder 63 is greater than the internal diameter of the elastomeric tube 50. It will be appreciated that the greater the disparity between the diameter of the shoulder 63 and the internal diameter of the elastomeric tube 50, the greater the resulting resistance for longitudinal translation and placement of the heater 60 within the elastomeric tube 50 as the elastomeric tube 50 must be stretched or deformed to a greater magnitude. Similarly, the longer the length of the shoulder 63, the greater the resulting resistance for longitudinal translation and placement of the heater 60 within the elastomeric tube 50 as a greater length of the elastomeric tube 50 must be stretched. The shoulder 63 may comprise a tapered or beveled edge at one or both ends of its longitudinal length to assist in placement of the heater 60 within the elastomeric tube 50 and removal from the same.

Figure 6:
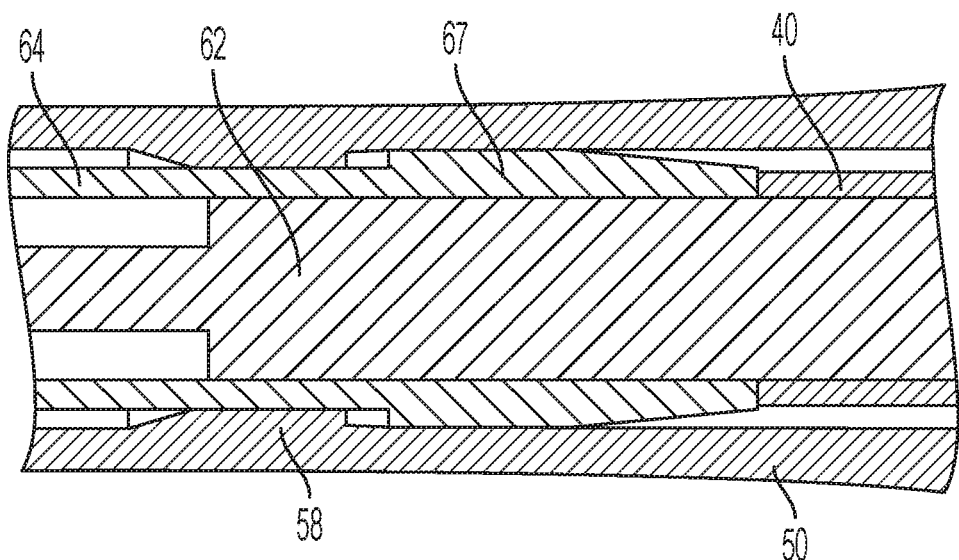
FIG. 6 is a detailed view of section A of FIG. 1.

With reference to FIG. 6, in one or more embodiments, the heater 60 is retained in the nutplate engagement fixture 30 by mating shoulders on the exterior diameter of the heater extension 64 and the interior diameter of the elastomeric tube 50, with the exterior diameter of the heater extension 64 being greater than the interior diameter of the elastomeric tube 50. Specifically, the heater extension 64 has a tapered enlarged shoulder to minimize installation resistance when inserted into the elastomeric tube 50. In addition, a heater extension shoulder 67 on the heater extension 64 may engage an elastomeric tube shoulder 58 having a complementary geometry. The heater extension shoulder 67 may be at a position proximal the junction with the heater cartridge 62. The elastomeric tube shoulder 58 may be at a position such that, upon insertion of the heater 60 into the nutplate engagement fixture 30, the heater extension shoulder 67 passes by and engages the elastomeric tube shoulder 58 immediately prior to abutment of the heater extension 64 against the rigid tube 40. As such, the heater 60 is held firmly in place by the elastomeric tube shoulder 58 with the heater extension shoulder 67 preventing backing out of the heater 60 from the nutplate engagement fixture 30.

In order to accurately monitor the heat curing temperature of the bonding adhesive and ensure appropriate cure profile is executed by a heater controller 90, at least one temperature sensor 70 is provided. The temperature sensor 70 may be positioned securely near a bonding surface 11 of the nutplate 10. The temperature data obtained from the at least one temperature sensor 70 can be logged and provide a feedback mechanism for the heater controller 90 to manage the heating power supplied to the heater 60. The heater controller 90 also may trigger one or more fail-safe mechanisms built in to the heater controller 90 to prevent excessive power draw above the rated capacity of the heater 60, heater temperature above the rated operating range of the heater 60, excessive substrate temperature, or excessive nutplate surface temperature.

The temperature sensor retention fixture 80 is operable to position and secure the at least one temperature sensor 70 to the nutplate 10. It will be appreciated that different and distinct styles of nutplates 10 including open style nutplates and dome style nutplates may entail usage of distinct styles of the temperature sensor retention fixture 80. For all styles of the temperature sensor retention fixture 80, passageways 82 are provided within the structure of the temperature sensor retention fixture 80 into which temperature sensor 70 and any associated wires may be embedded. The rigid design of the temperature sensor retention fixture 80 and the precise positioning of the temperature sensors 70 within the passageways 82 allows for consistent contact between the at least one temperature sensor 70 and the nutplate 10 at precisely defined locations.

Figure 7A:
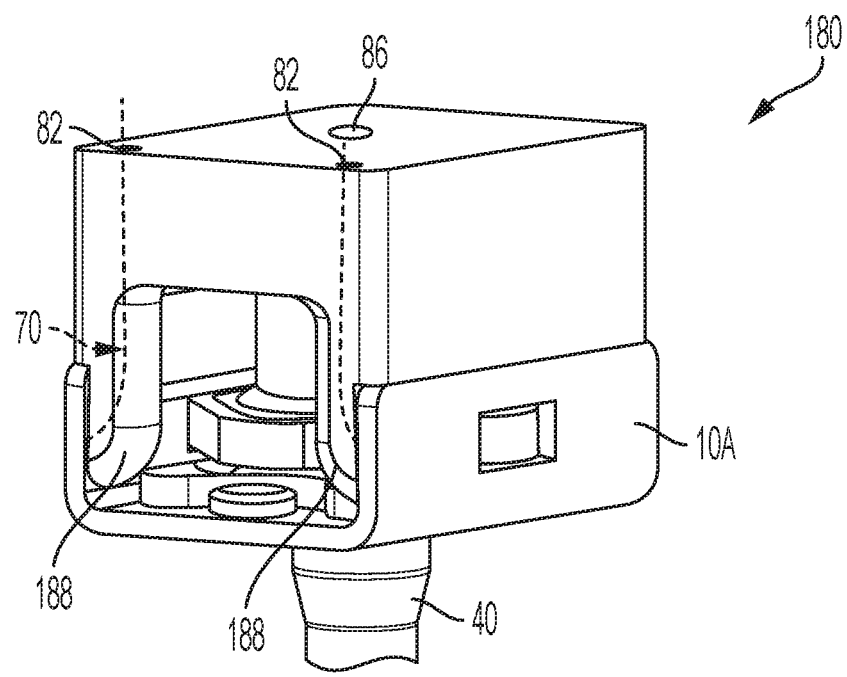
FIG. 7A is a schematic view of a temperature sensor retention fixture attached to an open style nutplate of a system for positioning and bonding a nutplate to a substrate comprising at least one aperture according to one or more embodiments of the present disclosure.
Figure 7B:
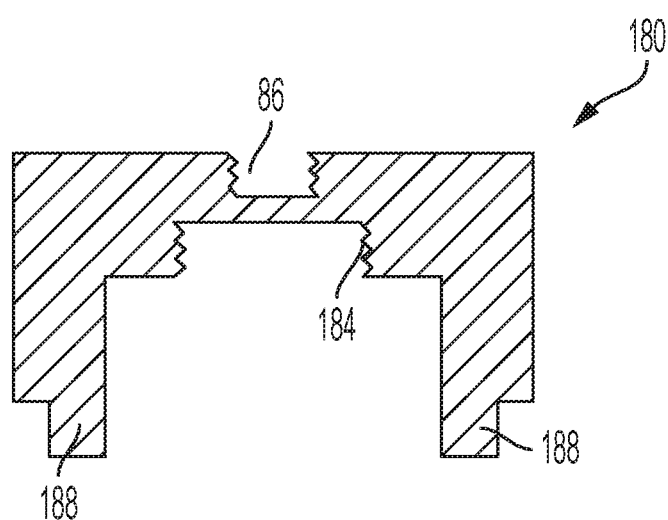
FIG. 7B is a cross sectional view of a temperature sensor retention fixture for attachment to an open style nutplate of a system for positioning and bonding a nutplate to a substrate comprising at least one aperture according to one or more embodiments of the present disclosure.

With reference to FIGS. 7A and 7B, in one or more embodiments, the temperature sensor retention fixture 180 is configured for mating with the open style nutplate 10A. The temperature sensor retention fixture 180 comprises parallel arms 188 sized to nest within the parallel flanges which are complementary on the open style nutplate 10A.

In one or more embodiments, the temperature sensor retention fixture 180 may comprise a threaded attachment element 184 configured for engagement with the external threads 42 of the rigid tube 40. Engagement with the external threads 42 of the rigid tube 40 serves to secure the temperature sensor retention fixture 180 to the open style nutplate 10A to allow contact of the at least one temperature sensor 70 with the open style nutplate 10A. Specifically, the temperature sensor retention fixture 180 allows for a threaded connection with the nutplate engagement fixture 30 to provide a secure connection until the rigid tube 40 is removed following curing of the adhesive utilized to secure the nutplate 10 to the panel 20.

With reference to FIGS. 8A, 8B, 9A, and 9B, in one or more embodiments, the temperature sensor retention fixture 280 is configured for mating with a dome style nutplate 10B. The temperature sensor retention fixture 280 comprises a body 282 enveloping the domed region 15 of the dome style nutplate 10B. The body 282 may form a snug friction fit with the dome style nutplate 10B and allow contact of the at least one temperature sensor 70 with the dome style nutplate 10B. Specifically, the body 282 forms a snap-in feature that fits snugly onto the outer contour of the dome style nutplate 10B.

With reference to FIGS. 7A, 7B, 8A, and 8B, in one or more embodiments the temperature sensor retention fixture 80 (180/280/380/480/580) may comprise a tethering element 120 for retrieval of the temperature sensor retention fixture 80 and temperature sensors 70 after curing of the adhesive. The tethering element 120 may comprise a flexible cord connected to the temperature sensor retention fixture 80 at the tether mounting point 86 which allows operators to safely reclaim the temperature sensor retention fixture 80 and temperature sensors 70 once the nutplate 10 is securely bonded to the panel 20. The tether mounting point 86 may comprise a threaded hole to accept and engaged a complementary threaded end on the tethering element 120. The tether may also be friction fit, or permanently affixed by adhesive bonding or plastic welding to the temperature sensor retention fixture 80 at the tether mounting point 86. While the tether mounting point 86 is generally shown in FIGS. 7A, 7B, 8A, and 8B as centrally located on the temperature sensor retention fixture 80, it will be appreciated that the tether mounting point 86 may be positioned at any location on the temperature sensor retention fixture 80 which does not interfere with the coupling of the temperature sensor retention fixture 80 to the nutplate 10.

The temperature sensor retention fixture 80 may comprise a release actuator configured to disengage the temperature sensor retention fixture 80 from the nutplate 10 upon actuation.

Figure 8A:
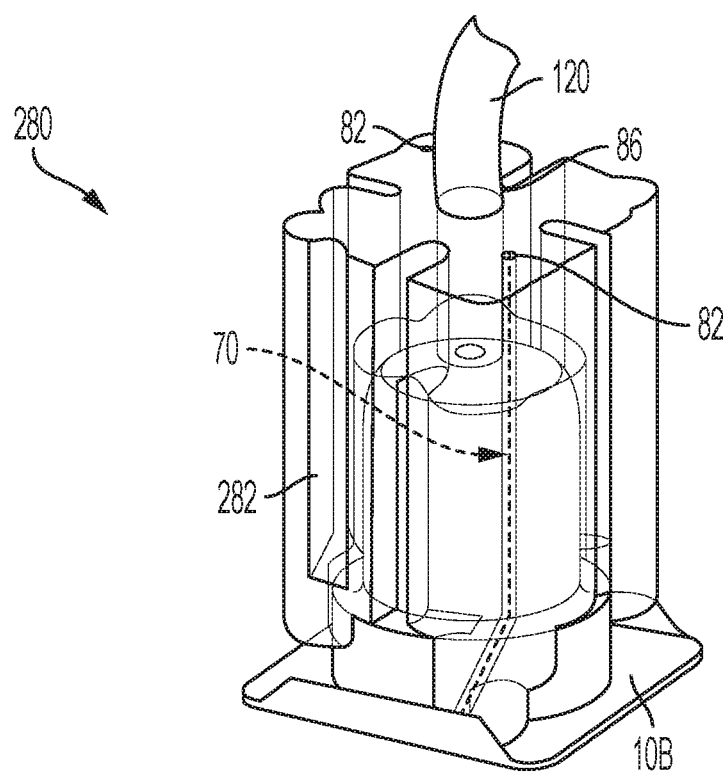
FIG. 8A is a transparent view of a temperature sensor retention fixture attached to a dome style nutplate of a system for positioning and bonding a nutplate to a substrate comprising at least one aperture according to one or more embodiments of the present disclosure.
Figure 8B:
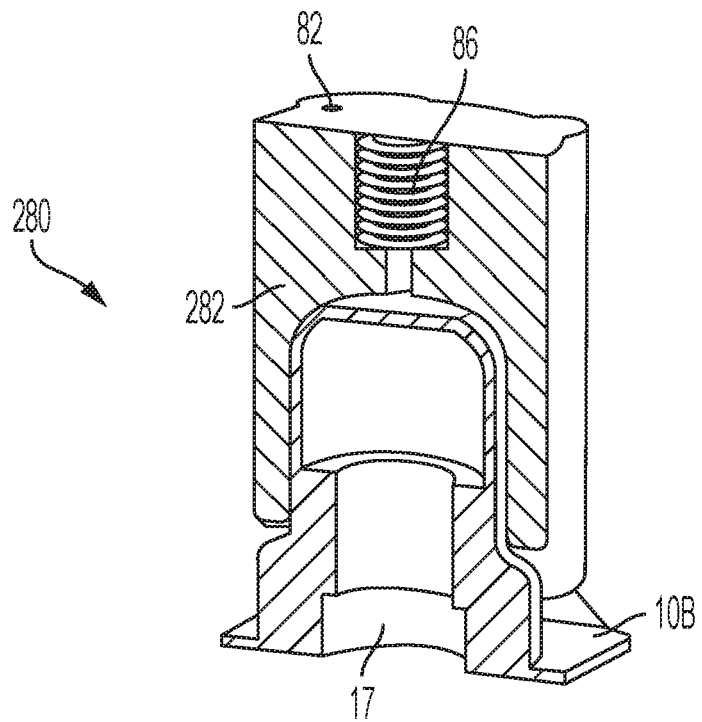
FIG. 8B is a cross sectional view of a temperature sensor retention fixture for attachment to a dome style nutplate of a system for positioning and bonding a nutplate to a substrate comprising at least one aperture according to one or more embodiments of the present disclosure.

With reference to FIGS. 8A and 8B, in one or more embodiments, the release actuator may be encompassed in the tethering element 120. Specifically, the temperature sensor retention fixture 280 comprises a flexible cable mounted at the tether mounting point 86 with the release actuator formed as part of the tethering element 120. In one or more embodiments, the tethering element 120 may comprise a Bowden cable. It will be appreciated by one skilled in the art that a Bowden cable is a type of flexible cable used to transmit mechanical force or energy by the movement of an inner cable relative to a hollow outer cable housing. In such embodiments, the tether mounting point 86 may be positioned with an end of the tethering element 120 engaged with the nutplate 10 such that upon activation of an engaging force with the Bowden cable the nutplate 10 is disengaged from the temperature sensor retention fixture 280.

Figure 9A:
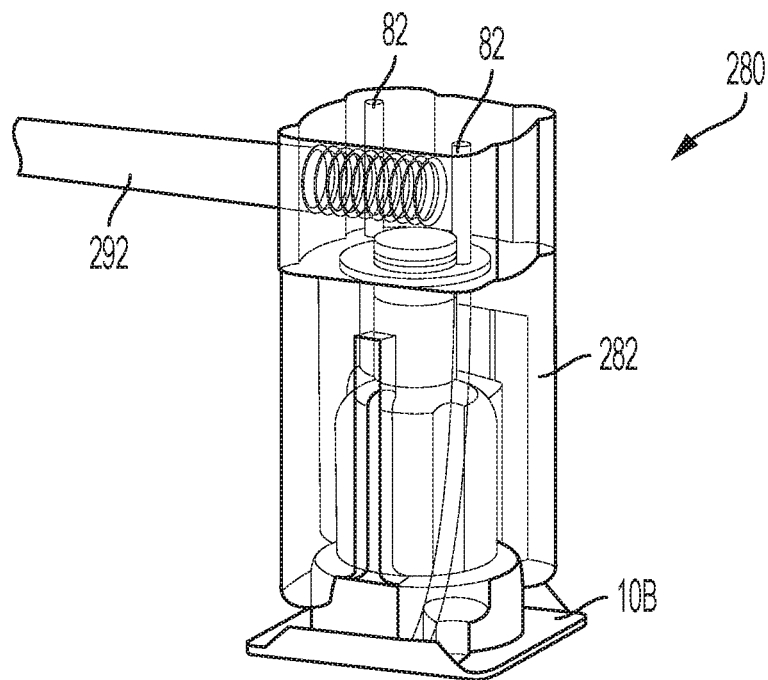
FIG. 9A is a transparent view of a temperature sensor retention fixture attached to a dome style nutplate of a system for positioning and bonding a nutplate to a substrate comprising at least one aperture according to one or more embodiments of the present disclosure.
Figure 9B:
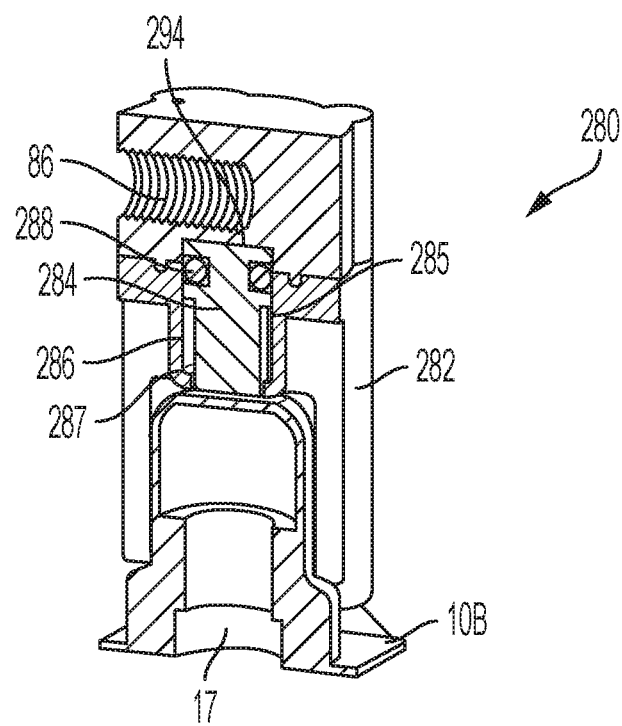
FIG. 9B is a cross sectional view of a temperature sensor retention fixture for attachment to a dome style nutplate of a system for positioning and bonding a nutplate to a substrate comprising at least one aperture according to one or more embodiments of the present disclosure.

With reference to FIGS. 9A and 9B, in one or more embodiments, the temperature sensor retention fixture 280 may also comprise a central piston 284 serving as the release actuator. The central piston 284 may be configured to apply a force to disengage the temperature sensor retention fixture 280 from the dome style nutplate 10B upon activation. The central piston 284 may be disposed in a channel 286 allowing axial travel of the central piston 284. In one or more embodiments, the central piston 284 and the channel 286 comprise complementary flanges or shoulders 285/287 configured to prevent travel of the central piston 284 beyond the channel 286.

In one or more embodiments in combination with the central piston 284, a sealing member 288 may be provided in a circumferential channel on the central piston 284. The sealing member 288 provides a seal between the central piston 284 and the channel 286. The sealing member 288 may comprise an elastomeric material. Further, the sealing member 288 may comprise an o-ring or other commercially available seal sized to provide a tight fit with the circumferential channel on the central piston 284 and the channel 286 formed in the body 282.

With continued reference to FIGS. 9A and 9B, in one or more embodiments the temperature sensor retention fixture 280 comprises a pneumatic release cable 292. The pneumatic release cable 292 triggers disengagement of the temperature sensor retention fixture 280 from the nutplate 10. The pneumatic release cable 292 may be connected to the temperature sensor retention fixture 280 in fluid communication with the central piston 284 of the temperature sensor retention fixture 280. The pneumatic release cable 292 is configured to provide a pneumatic force to the central piston 284 to disengage the temperature sensor retention fixture 280 from the nutplate 10 upon activation. It will be appreciated that the central piston may also be activated as a piezoelectric or other mechanical actuator, with the pneumatic scenario of the present disclosure being provided as an example. In one or more embodiments, the pneumatic release cable 292 may be the tethering element 120. Specifically, the pneumatic release cable 292 may be connected to the temperature sensor retention fixture 280 via a threaded or bonded connection where the pneumatic release cable 292 comprising external threads configured for engagement with the tether mounting point 86 of the temperature sensor retention fixture 280. Further, the fluid communication between the pneumatic release cable 292 and the central piston 284 may be provided via an airflow passage 294 connecting the tether mounting point 86 and the channel 286.

The pneumatic release cable 292 may be a flexible tube capable of passage of pressurized air therethrough. In various embodiments, the pneumatic release cable 292 is comprised of a flexible plastic tube, a flexible braided conduit, or a flexible elastomer tube. The pneumatic release cable 292 allows air to pass through and is flexible such that is can fit into tight spaces and around tight bends.

Figure 10A:
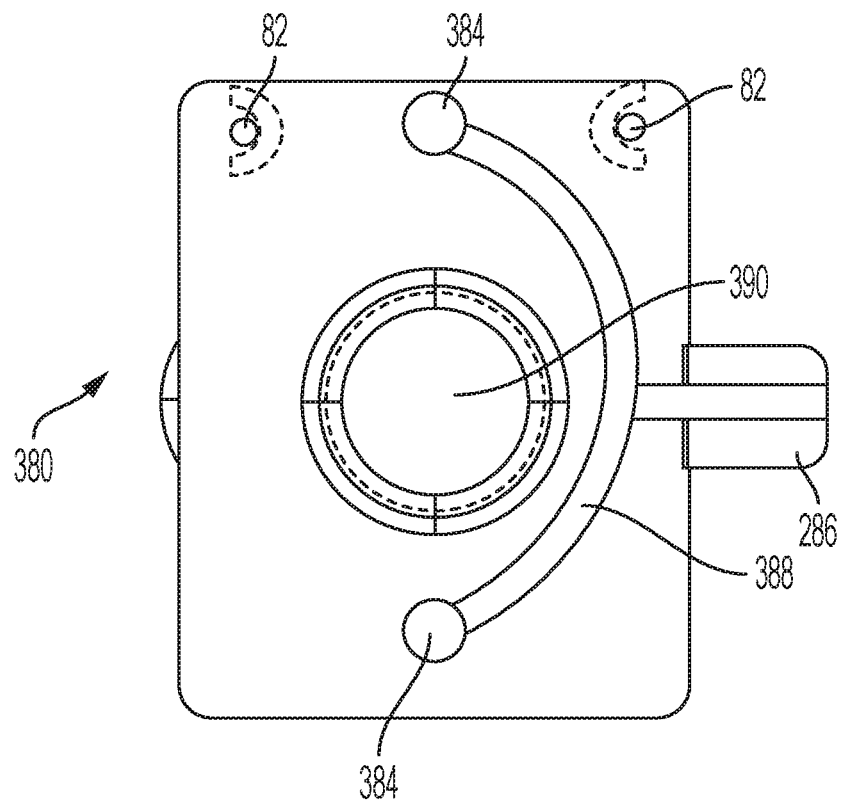
FIG. 10A is a cross sectional view of a temperature sensor retention fixture for attachment to an open style nutplate comprising an extended floating nut element of a system for positioning and bonding a nutplate to a substrate comprising at least one aperture according to one or more embodiments of the present disclosure.
Figure 10B:
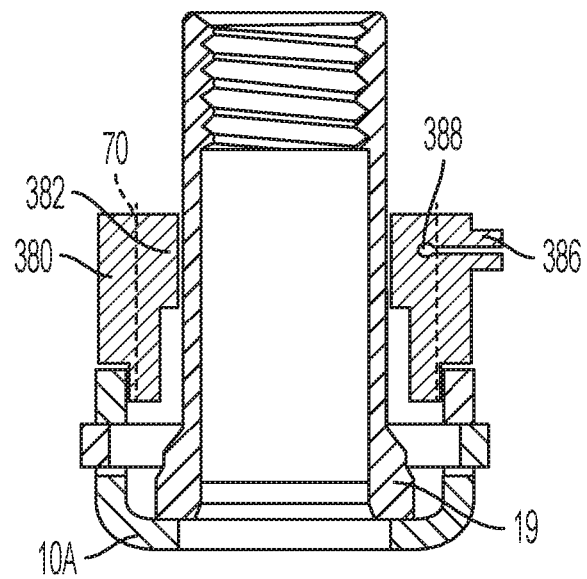
FIG. 10B is a cross sectional view of a temperature sensor retention fixture for attachment to an open style nutplate comprising an extended floating nut element of a system for positioning and bonding a nutplate to a substrate comprising at least one aperture according to one or more embodiments of the present disclosure.

With reference to FIGS. 10A and 10B, in one or more embodiments, the temperature sensor retention fixture 380 may be configured to accommodate open-style nutplates 10A comprising an extended floating nut element 19. Specifically, the temperature sensor retention fixture 380 may comprise a centrally located hole 390 sized to accommodate passage of the floating nut element 19 such that the temperature sensor retention fixture 380 may nest on the open-style nutplate 10A with the floating nut element 19 passing through the centrally located hole 390.

The temperature sensor retention fixture 380 configured to accommodate open-style nutplates 10A comprising an extended floating nut element 19 may additionally comprise at least one peripheral piston 384 positioned at the bottom of the temperature sensor retention fixture 380 adjacent to the nutplate flat region 12 serving as the release actuator. The body 382 may form a snug friction fit with the extended floating nut element 19. The peripheral piston 384 may be connected to the pneumatic release cable 292 via a pneumatic inlet 386 and air channels 388 such that the pneumatic release cable 292 may trigger disengagement of the temperature sensor retention fixture 380 from the nutplate 10 upon activation of the peripheral piston 384. Specifically, the pneumatic release cable 292 may be connected to the temperature sensor retention fixture 380 providing fluid communication with the peripheral piston 384 of the temperature sensor retention fixture 380 such that provision of compressed air within the pneumatic release cable 292 forces the peripheral piston 384 to extend. The extension of the peripheral piston 384 applies a force to the nutplate flat region 12 forcing separation of the nutplate 10 and the temperature sensor retention fixture 380. It will be appreciated that the peripheral piston 384 may also be activated as a piezoelectric or other mechanical actuator, with the pneumatic scenario of the present disclosure being provided as an example.

Figure 11A:
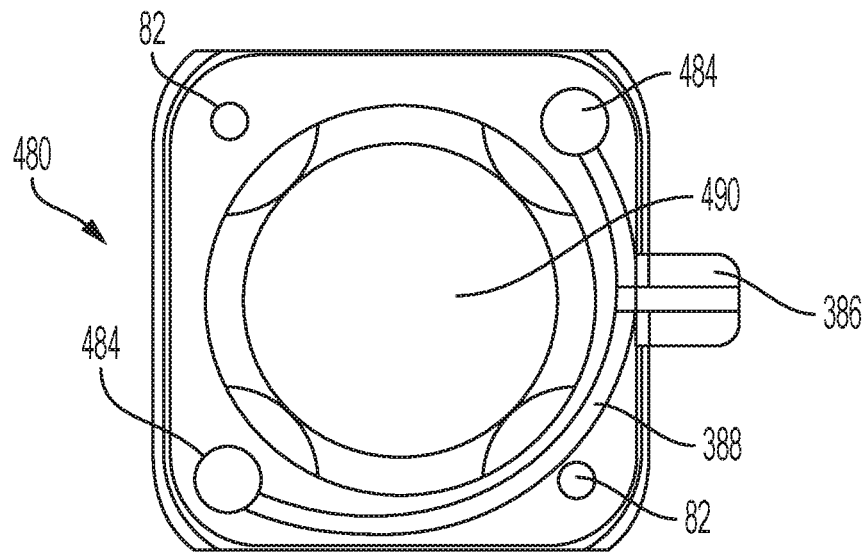
FIG. 11A is a cross sectional view of a temperature sensor retention fixture for attachment to a dome style nutplate comprising an extended domed region of a system for positioning and bonding a nutplate to a substrate comprising at least one aperture according to one or more embodiments of the present disclosure.
Figures 11B, 11C:
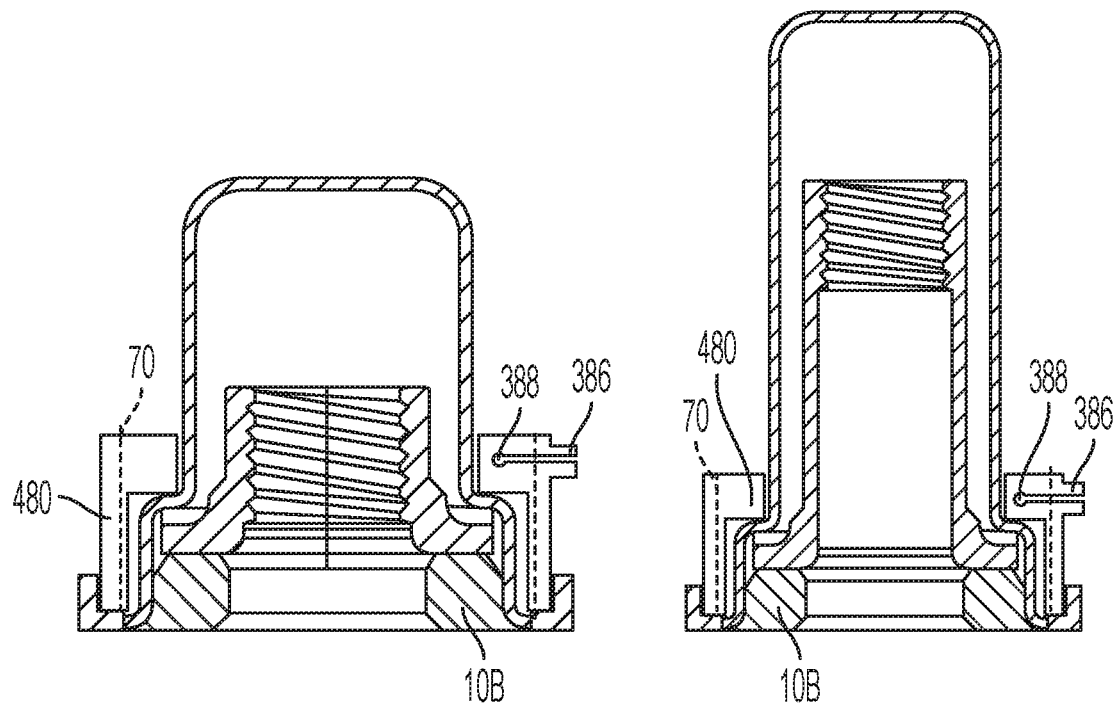
FIG. 11B is a cross sectional view of a temperature sensor retention fixture for attachment to a dome style nutplate comprising an extended domed region of a system for positioning and bonding a nutplate to a substrate comprising at least one aperture according to one or more embodiments of the present disclosure.
FIG. 11C is a cross sectional view of a temperature sensor retention fixture for attachment to a dome style nutplate comprising an extended domed region of a system for positioning and bonding a nutplate to a substrate comprising at least one aperture according to one or more embodiments of the present disclosure.

Similar to the temperature sensor retention fixture 380 configured for tall open style nutplates 10A, a temperature sensor retention figures 480 may be configured for interfacing with tall domed style nutplates 10B. With reference to FIGS. 11A, 11B, and 10C, in one or more embodiments, the temperature sensor retention fixture 480 may be configured to accommodate dome-style nutplates 10B comprising an extended domed region 15. Specifically, the temperature sensor retention fixture 480 may comprise a centrally located hole 490 sized to accommodate passage of the domed region 15 such that the temperature sensor retention fixture 480 may nest on the dome-style nutplate 10B with the domed region 15 passing through the centrally located hole 490.

The temperature sensor retention fixture 480 configured for engagement with a tall dome style nutplate 10B may additionally comprise at least one peripheral piston 484 positioned at the bottom of the temperature sensor retention fixture 480 adjacent to dome style nutplate flat region 16 serving as the release actuator. The peripheral piston 484 may be connected to the pneumatic release cable 292 via a pneumatic inlet 386 and air channels 388 such that the pneumatic release cable 292 may trigger disengagement of the temperature sensor retention fixture 480 from the nutplate 10 upon activation of the peripheral piston 484. Specifically, the pneumatic release cable 292 may be connected to the temperature sensor retention fixture 480 providing fluid communication with the peripheral piston 484 of the temperature sensor retention fixture 480 such that provision of compressed air within the pneumatic release cable 292 forces the peripheral piston 484 to extend. The extension of the peripheral piston 484 applies a force to the dome style nutplate flat region 16 forcing separation of the nutplate 10 and the temperature sensor retention fixture 480. It will be appreciated that the peripheral piston 484 may also be activated as a piezoelectric or other mechanical actuator, with the pneumatic scenario of the present disclosure being provided as an example.

The open top design of the temperature sensor retention fixtures 380 and 480 with the floating nut element 19 and the domed region 15 of the nutplate 10 respectively projecting therethrough minimizes the total height of the assembly of the nutplate 10 and the temperature sensor retention fixture 380/480. Minimizing total height assists in successful installation of tall nutplates 10 onto panels 20 within tight spaces such as within a confined aircraft substructure.

Figure 12:
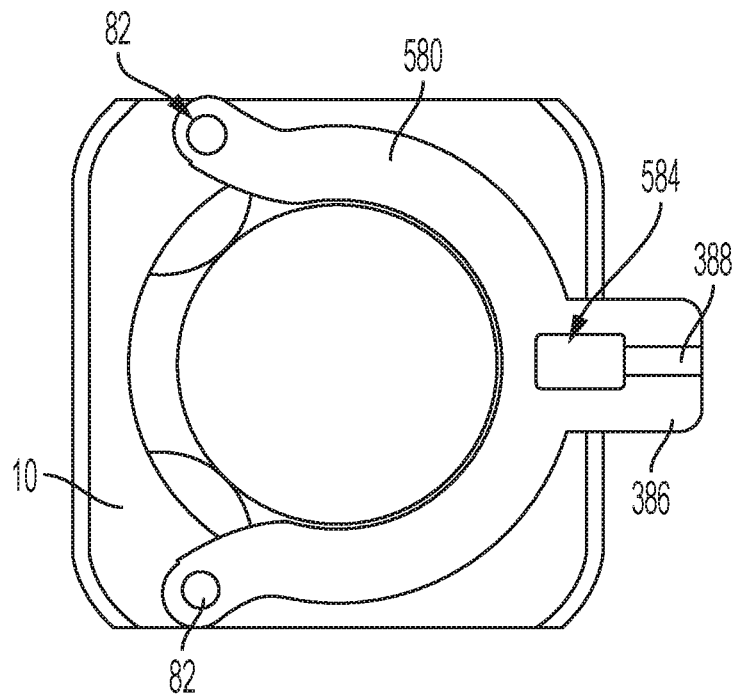
FIG. 12 is a cross sectional view of a temperature sensor retention fixture comprising a C-shaped clip for attachment to a nutplate of a system for positioning and bonding a nutplate to a substrate comprising at least one aperture according to one or more embodiments of the present disclosure.
Figure 13:
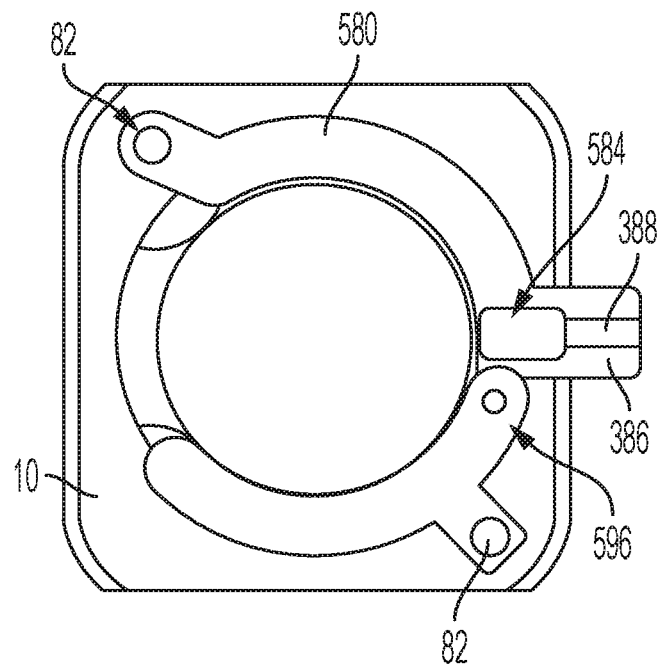
FIG. 13 is a cross sectional view of a temperature sensor retention fixture comprising a C-shaped clip for attachment to a nutplate of a system for positioning and bonding a nutplate to a substrate comprising at least one aperture according to one or more embodiments of the present disclosure.
Figure 17A:
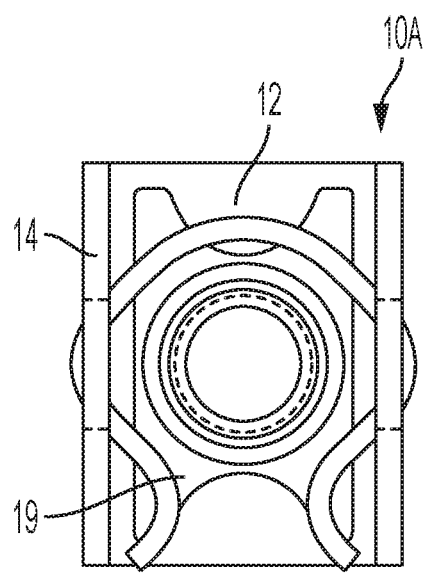
FIG. 17A is a top view of the outer surface of an open style nutplate utilized in a system for positioning and bonding a nutplate to a substrate comprising at least one aperture according to one or more embodiments of the present disclosure.
Figure 17B:
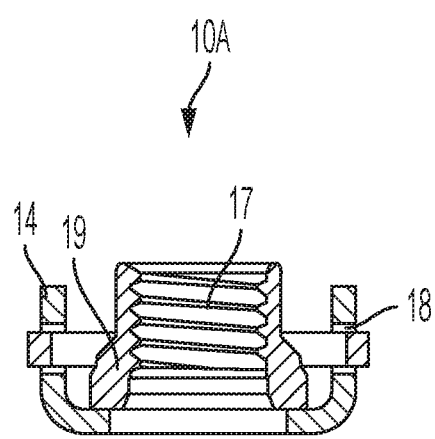
FIG. 17B is cross-sectional view of FIG. 17A.

With reference to FIGS. 12 and 13, in one or more embodiments, the temperature sensor retention fixture 580 comprises a C-shape clip with a disengagement piston 584 positioned adjacent to the cylindrical exterior wall of the floating nut element 19 or domed region 15 serving as the release actuator. The temperature sensor retention fixture 580 is secured onto the floating nut element 19 of the open style nutplate 10A or the domed region 15 of the dome style nutplate 10 with a snug clamping fit. Specifically, the temperature sensor retention fixture 580 comprises a snap-in gripping feature that fits snugly onto the external wall contour of the floating nut element 19 or domed region 15. With reference to FIG. 17 in particular, the C-shape clip may be provided with a two-piece construction and with a torsion spring hinge mechanism 596 connecting the two pieces. For removal of the temperature sensor retention fixture 580 from the nutplate 10, the disengagement piston 584 may be connected to the pneumatic release cable 292. The pneumatic release cable 292 triggers disengagement of the temperature sensor retention fixture 580 from the nutplate 10 by extending the disengagement piston 584 and forcing separation of the temperature sensor retention fixture 580 and the floating nut element 19 or the domed region 15 of the open style nutplate 10A and dome style nutplate 10B respectively. It will be appreciated that the disengagement piston 584 may also be activated as a piezoelectric or other mechanical actuator, with the pneumatic scenario of the present disclosure being provided as an example.

Figure 18:
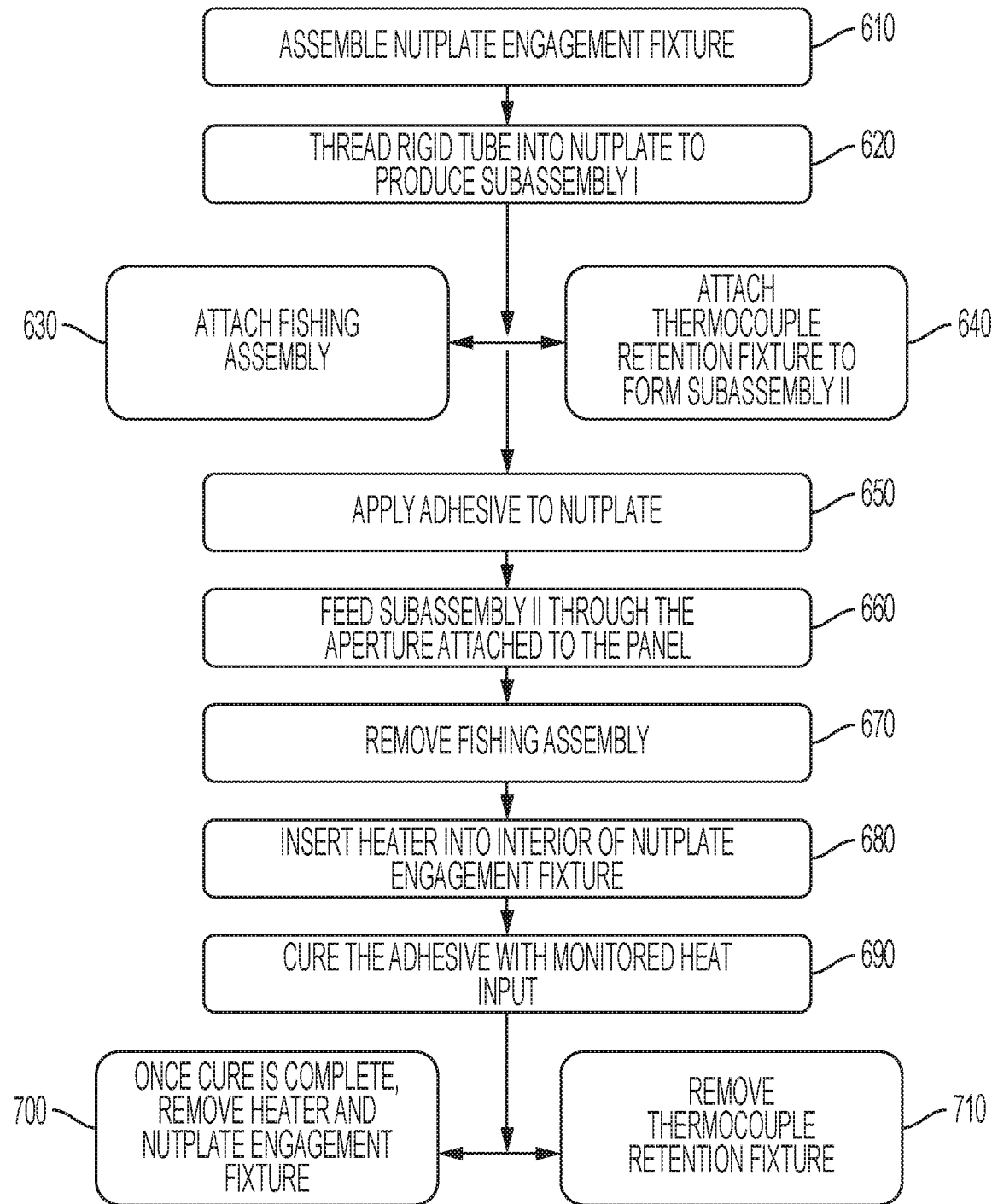
FIG. 18 is a flow diagram for one embodiment of a method of positioning and bonding a nutplate to a substrate comprising at least one aperture according to one or more embodiments of the present disclosure.

With reference to FIG. 18, in one or more embodiments, the nutplate retention system 5 comprises a fishing fixture 110 for positioning a nutplate installation assembly 100 comprising the nutplate 10, the nutplate engagement fixture 30, and the temperature sensor retention fixture 80 onto the panel 20. Access to both sides of the panel 20 during installation of the nutplate 10 is not always readily available. Specifically, the apertures 25 of the panel 20 may be positioned such that they are not within the reach of an arm because of distance or size restrictions from the structure underlying the panel 20. As such, the fishing fixture 110 allows a cable 112 to be passed through the interior structure underlying the panel 20 and affixed to the elastomeric tube 50 with a securement plug 114. The cable 112 may be affixed to the securement plug through any means known to one skilled in the art including adhesive or a threaded connection. The securement plug 114 may be removably secured to the elastomeric tube 50 with a friction fit. Specifically, the securement plug 114 may comprise a cylindrical geometry with a diameter larger than the interior diameter of the elastomeric tube 50 such that the securement plug 114 may be inserted into the elastomeric tube 50 with a commensurate stretching of the diameter of the elastomeric tube 50 providing a retentive force. After affixing the fishing fixture 110 to the elastomeric tube 50, the entire nutplate installation assembly 100 may be pulled with the cable 112 through the interior structure underlying the panel 20 to position the nutplate 10 in alignment with the aperture 25 on an interior face of the panel 20 that is inaccessible by hand.

In one or more embodiments, the securement plug 114 includes a conical frustum 116 at the end of the securement plug 114 comprising attachment of the cable 112. The conical frustum 116 provides a flat surface upon which a hole may be provided for attachment of the cable 112. Further, the conical frustum 116 provides a tapered geometry at the leading edge of the securement plug 114 during passage through the aperture 25 of the panel 20. Specifically, the tapered geometry assists in aligning and centering the securement plug 114 to facilitate the passage of the affixed elastomeric tube 50 through the aperture 25. In one or more embodiments, the conical frustum 116 also comprises a diameter at the base greater than the diameter of the remainder of the securement plug 114, thereby providing a circumferential ledge. The circumferential ledge may provide a stop against the elastomeric tube 50 upon full insertion of the securement plug 114.

In one or more embodiments, the securement plug 114 includes a tapered edge 118 around the periphery of the end of the securement plug 114. The tapered edge 118 assists with centering and aligning the securement plug 114 with the interior of the elastomeric tube 50 during insertion of the securement plug 114 into the elastomeric tube 50.

With reference to FIG. 1, in one or more embodiments, an exterior securement washer 98 may optionally be incorporated into the bonded hardware installation process to improve safety and reliability. The exterior securement washer 98 has a through-hole with a diameter sized to substantially match the diameter of the apertures 25 in the panel 20. The exterior securement washer 98 may be passed over the elastomeric tube 50 and positioned in a position abutting the panel 20. As such, the exterior securement washer 98 provides additional holding force through frictional interaction with the elastomeric tube 50 to retain the nutplate 10 in tension against the opposing surface of the panel 20. In one or more embodiments, at least one passageway 99 is provided within the structure of the washer into which a temperature sensor 70 may be embedded.

To position the exterior securement washer 98, prior to inserting the heater 60 into the elastomeric tube 50, the exterior securement washer 98 is installed around the elastomeric tube 50 and positioned onto the exterior surface of the panel 20, opposite the adhesive bonding surface 11. Installing the exterior securement washer 98 is accomplished by pulling on the elastomeric tube 50 which reduces in diameter when subjected to tensile load (i.e. Poisson's effect) to allow passage of the exterior securement washer 98 along the length of the elastomeric tube 50. Once in position the tensile force can be relieved from the elastomeric tube 50 thereby expanding the elastomeric tube 50 in diameter and producing an interference fit with the through-hole of the exterior securement washer 98. For additional temperature feedback and control the temperature sensor 70 can be positioned within the passageway 99 or affixed to the surface of the exterior securement washer 98 abutting the panel 20 prior to installation on the elastomeric tube 50. Once the exterior securement washer 98 is installed onto the panel 20, the temperature sensor 70 is made to contact the panel 20 on the exterior surface opposite the adhesive bonding surface 11, providing a measure of the temperature of the panel 20 surface.

Turning from the above discussion of components of the nutplate retention system 5, the following discussion relates to the utilization of these components in processes for adhering a nutplate 10 to a panel 20. In one or more embodiments, the method comprises assembling the nutplate engagement fixture 30 by coupling the rigid tube 40 with the elastomeric tube 50, coupling the nutplate 10 with the nutplate engagement fixture 30, coupling the fishing fixture 110 to the elastomeric tube 50, coupling the temperature sensor retention fixture 80 to the nutplate 10, applying adhesive onto the bonding surface 11 of the nutplate 10, inserting the nutplate engagement fixture 30 through an aperture 25 of the panel 20 until a surface of the panel 20 contacts the bonding surface 11 having adhesive applied thereon, and adhering the nutplate 10 to the bonding surface of the panel 20 by applying localized heat through a heater 60 disposed within the nutplate engagement fixture 30. Finally, the method further comprises removing the heater 60, the nutplate engagement fixture 30, and the temperature sensor retention fixture 80 from the nutplate 10 after the adhering step.

Referring to FIG. 3, the nutplate engagement fixture 30 is assembled by coupling the rigid tube 40 with the elastomeric tube 50 (FIG. 18, step 610). Specifically, the rigid tube 40 is pressed into the elastomeric tube 50 so that the elastomeric tube retention shoulder 44 on the rigid tube 40 is engaged with the retention lip 54 of the elastomeric tube 50. Alternatively, the nutplate engagement fixture 30 may be assembled by over-molding of the elastomeric tube 50 onto rigid tube 40 in a manufacturing environment.

The nutplate 10 is then coupled with the nutplate engagement fixture 30 to form subassembly I (FIG. 18, step 620). In one or more embodiments, the nutplate 10 and the nutplate engagement fixture 30 may be coupled by threading the rigid tube 40 of the nutplate engagement fixture 30 into the threaded hole 17 of the nutplate 10.

In one or more embodiments, the fishing fixture 110 is also affixed to the elastomeric tube 50 of the nutplate engagement fixture 30 (FIG. 18, step 630). The fishing fixture 110 is attached to the nutplate engagement fixture 30 by inserting the securement plug 114 into the free end of the elastomeric tube 50. The securement plug 114 is retained in the elastomeric tube 50 with a friction fit provided by the compressive force of the elastomeric tube 50 stretched around the securement plug 114. It will be appreciated that attachment of the fishing fixture 110 is not necessary when ample access is available to position subassembly I without the aid of the fishing fixture 110.

The temperature sensor retention fixture 80 is then coupled with the nutplate 10 to form subassembly II alternatively referenced as the nutplate installation assembly 100 (FIG. 18, step 640). Subassembly II may include solely the temperature sensor retention fixture 80 and subassembly I or additionally the fishing fixture 110. With reference to FIGS. 7A and 7B, in one or more embodiments comprising the open style nutplate 10A, the temperature sensor retention fixture 80 is coupled with the open style nutplate 10A by advancing the rigid tube 40 such that the external threads 42 on the rigid tube 40 engage with the threaded attachment element 184 of the temperature sensor retention fixture 180. With reference to FIGS. 8A, 8B, 9A, and 9B, in one or more embodiments comprising the dome style nutplate 10B, the temperature sensor retention fixture 280 is coupled with the dome style nutplate 10B by pressing the temperature sensor retention fixture 280 over the domed region 15 of the dome style nutplate 10B to engage the snap-fit or friction fit of the temperature sensor retention fixture 280 thereto.

Figure 14:
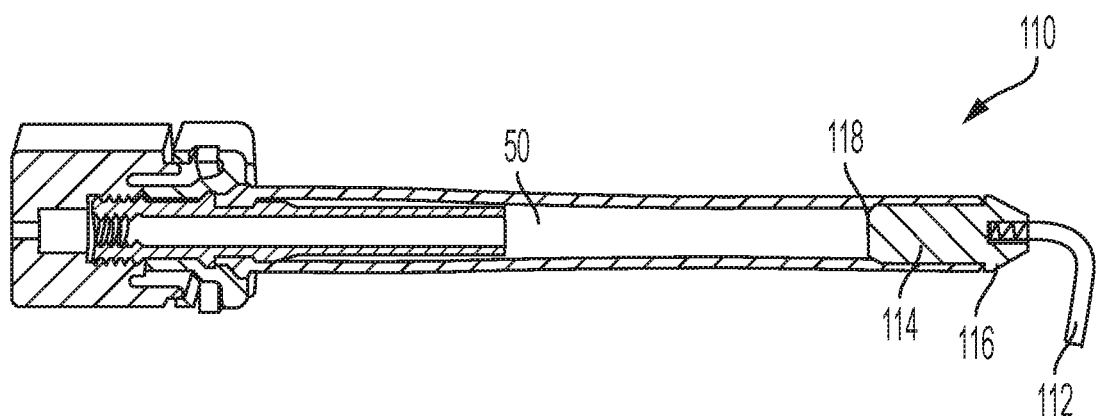
FIG. 14 is a cross sectional view of attachment of a fishing fixture to a nutplate engagement fixture of a system for positioning and bonding a nutplate to a substrate comprising at least one aperture according to one or more embodiments of the present disclosure.

Subsequently, the adhesive is applied to the nutplate 10 (FIG. 18, step 650) and subassembly II of the nutplate retention system 5, as shown in FIG. 14, is then fed through the aperture 25 of the panel 20 (FIG. 18, step 660). Specifically, the elastomeric tube 50 is fed through the aperture 25 and pulled taut to engage the flared section 52 of the elastomeric tube 50 with an increased external diameter. It will be appreciated that the flared section 52 provides a compressive force and/or friction fit with the aperture 25 when the elastomeric tube 50 is inserted into the aperture 25. Further, engaging the flared section 52 concurrently draws the nutplate 10 against panel 20 allowing the adhesive to spread across the bonding surface 11 until the desired bondline thickness is achieved.

After engagement of subassembly II with the aperture 25, the fishing fixture 110, if present and utilized, is removed (FIG. 18, step 670). The fishing fixture 110 may be removed from the elastomeric tube 50 by restraining the elastomeric tube 50 and applying a pulling force to the cable 112 or directly to the securement plug 114 to overcome the compressive force of the elastomeric tube 50 on the securement plug 114.

The exterior securement washer 98 with embedded temperature sensors 70 may optionally be installed onto the subassembly II by inserting the elastomeric tube 50 through the through-hole on the exterior securement washer 98. The exterior securement washer 98 is then secured onto the panel 20 by pulling on the elastomeric tube 50. Once in position, the tensile force can be reduced on the elastomeric tube 50, which expands in diameter and produces an interference fit with the through-hole of the exterior securement washer 98.

The heater 60 is then inserted into the interior of the nutplate engagement fixture 30 (FIG. 18, steps 680). With reference to FIGS. 4A and 4B, in one or more embodiments, the heater 60 is retained in the nutplate engagement fixture 30 with the threaded region 66 at the tip of the heater 60. Specifically, the heater 60 may be threadibly engaged with the rigid tube 40 to secure and retain the heater 60 in position for curing of the nutplate 10 to the panel 20. In embodiments where the heater extension 64 of the heater 60 comprises a hex head 68 or other non-circular geometry a tool may be used to interface with the heater extension 64 to allow screwing of the heater 60 into the rigid tube 40 and subsequent removal. With reference to FIG. 5, in one or more embodiments, the heater 60 is retained in the nutplate engagement fixture 30 by the shoulder 63 on the heater 60 which provides a resistance or friction fit against the elastomeric tube 50 as the diameter of the shoulder 63 is greater than the internal diameter of the elastomeric tube 50. With reference to FIG. 6, in one or more embodiments, the heater 60 is retained in the nutplate engagement fixture 30 by engaging the heater extension shoulder 67 on the heater extension 64 with the complementary geometry of the elastomeric tube shoulder 58. Specifically, upon insertion of the heater 60 into the nutplate engagement fixture 30, the heater extension shoulder 67 passes by and engages the elastomeric tube shoulder 58 immediately prior to abutment of the heater extension 64 against the rigid tube 40. As such, the heater 60 is held firmly in place with the elastomeric tube shoulder 58 and the heater extension shoulder 67 preventing backing out of the heater 60 from the nutplate engagement fixture 30.

Upon engagement and securing of the heater 60 in the nutplate engagement fixture 30, curing of the adhesive is begun (FIG. 18, step 690). The rapid cure process may be carried out by operating the heater controller 90 to deliver resistive heating via the heater 60 at the bonding surface 11. The heater controller 90 may further monitor and regulate the heating profile over the rapid cure process through a feedback mechanism with the use of the temperature sensors 70. The heater controller 90 comprises microprocessor, temperature and power controllers, data input output ports, and the one or more temperature sensors 70.

Further, referring to FIG. 18, after the curing step, which may occur for 1 to 6 hours, the heater 60 may be removed from the nutplate engagement fixture 30 and the nutplate engagement fixture 30 may subsequently be removed from the nutplate 10 (FIG. 18, step 700) which has been bonded to the panel 20. In one or more embodiments, removing the heater 60 from the nutplate engagement fixture 30 comprises unthreading the threaded region 66 at the tip of the heater 60 from the rigid tube 40 and withdrawing the heater 60 from the nutplate engagement fixture 30. In one or more further embodiments, removing the heater 60 comprises applying a withdrawing force to the heater to overcome the resistance or friction fit between the shoulder 63 on the heater 60 and the internal diameter of the elastomeric tube 50. Similarly, in one or more further embodiments, removing the heater 60 comprises applying a withdrawing force to the heater to overcome the engagement between the heater extension shoulder 67 and the elastomeric tube shoulder 58 thereby allowing the heater 60 to be fully withdrawn from the nutplate engagement fixture 30.

In one or more embodiments, removing the nutplate engagement fixture 30 is a two-step process. In a first step the elastomeric tube 50 is disengaged from the rigid tube 40 by apply a force to overcome the engagement between the elastomeric tube retention shoulder 44 on the rigid tube 40 that is engaged with the retention lip 54 of the elastomeric tube 50. In a second step the rigid tube 40 is disengaged from the nutplate 10 by unthreading the rigid tube 40 from the threaded hole 17 of the nutplate 10. The rigid tube 40 can be secured for unthreading by threading a tool into the internal threads 46 of the rigid tube 40 as the internal threads 46 are provided with an opposite handedness as those of the external threads 42 resulting in a tightening action on the internal threads 46 causing an opposite loosing action at the external threads 42.

Finally, the temperature sensor retention fixture 80 is removed from the nutplate 10 and drawn out with the tethering element 120 (FIG. 18, step 710). In one or more embodiments with the open style nutplate 10A, the temperature sensor retention fixture 180 may be disengaged from the open style nutplate 10A automatically upon removal of the rigid tube 40 as the external threads 42 on the rigid tube 40 are disengaged from the threaded attachment element 184 of the temperature sensor retention fixture 180. A tugging force on the tethering element 120 may also be required in some instances to release the temperature sensor retention fixture 180 from the open style nutplate 10A after removal of the rigid tube 40 to overcome any friction forces retaining the temperature sensor retention fixture 180 in engagement with the open style nutplate 10A. In one or more embodiments with the dome style nutplate 10B, the temperature sensor retention fixture 280 may be disengaged from the dome style nutplate 10B with application of compressed air to the pneumatic release cable 292. The pneumatic release cable 292 triggers disengagement of the temperature sensor retention fixture 280 from the dome style nutplate 10B by actuating the central piston 284 of the temperature sensor retention fixture 280 which is engaged with the domed region 15 of the dome style nutplate 10B thereby forcing separation of the temperature sensor retention fixture 280 and the dome style nutplate 10B. Similarly, in one or more embodiments with the dome style nutplate 10B, the tethering element 120 may comprise a Bowen cable which is engaged with the domed region 15 of the dome style nutplate 10B thereby forcing separation of the temperature sensor retention fixture 280 and the dome style nutplate 10B when activated.

In this accelerated cure process, the bulk of the material cure can occur in a shortened timespan to the desirable cure state, but further undesired reactions from elevated temperature "post-cure" are avoided. Without being bound by theory, in a polymer material such as a two-part epoxy adhesive, the reaction of smaller precursor molecules (e.g., monomers, pre-polymers) results in the growth of larger and increasing molecular weight chains of the constituent molecules. If the polymerization is allowed to proceed only at room temperature, the formation of networked polymer chains will gradually impede the mobility of remaining reactive molecules, essentially slowing down and eventually arresting the polymerization and cure of the material to achieve specified polymer properties. At an elevated temperature, the mobility of any remaining reactive molecules will be increased and thus increasing the polymerization rate of the material, thus reducing the time required to achieve a similar cure state comparing with curing at room temperature.

In one or more embodiments, the process may also comprise preparing the surface of the panel 20. This may involve cleaning the panel 20 surface to facilitate better adhesion once the nutplate 10 is adhesively bonded to the panel 20.

Additionally, to monitor the adhesive curing and bonding of the nutplate 10 to the panel 20, a feedback temperature control mechanism may be utilized so that the desired temperature profile can be maintained irrespective of panel material. The feedback temperature control mechanism may include the at least one temperature sensor 70 in communication with a controller. Various suitable controllers, such as a power controller, a temperature controller, are contemplated as long as they can regulate specific parameters based on input from the temperature sensor. A single controller 90 may interface with one or multiple sets of the heater 60, the temperature sensor retention fixture 80/180/280/380/480/580, and the nutplate engagement fixture 30. In specific embodiments, the controller for the temperature and the power source for the heating component may be integrated into the same unit to form the feedback temperature control mechanism.

The nutplate retention system 5 may further comprise a digital record retention system. The digital record retention system provides easily retrievable records of installation parameters, maintenance history, and operation status, including environmental conditions, on all nutplate parts in-situ on the substrate to facilitate logistic and maintenance planning. In one or more embodiments, digital record retention system enables remote assessment of part status (for example, service hour history) or part curing status (for example, parameters of nutplate installation). Such digital record retention system also provides end-to-end traceability on parts and makes collected information readily available to the technicians and engineers involved in logistic and maintenance planning through computer networks, wireless networks, and/or mobile devices.

The digital record retention system comprises a writable storage medium configured to record process parameters of the bonding of the nutplate to the substrate including environmental conditions at time of bonding, temperature readings from the at least one temperature sensor with respect to time, and identifying codes assigned to each component of the system utilized in bonding of the nutplate to the substrate. In addition it can also record information related to the status of the nutplate retention system 5 such as power and error status. Specifically, the environmental conditions at time of bonding may include air temperature and humidity levels at the location and time of nutplate adherence. The temperature readings from the at least one temperature sensor with respect to time may also be recorded to provide a plot of adhesive and nutplate heating during the cure cycle. The temperature profile may provide insight to strength parameters of the bond and provide guidance in the event of bond failure or bonding process disruption such as power failure. Further, identifying codes assigned to each component of the nutplate retention system utilized in bonding of the nutplate to the substrate provides traceable history in the event of a bond failure. For example, unique serial numbers and/or identifying bar codes may be provided on each nutplate, fixture, heater, adhesive and other component used in the installation of the nutplate on the substrate to allow scanning and tracking for each step and variable of each individual nutplate installation event. The recording of the adhesive batch number used on each nutplate installation allows for accounting of suspect nutplate installations in the event of later determination of faulty adhesive. Notes from technicians during nutplate installation or later inspections may also be recorded to provide a more complete portfolio of data regarding the nutplate installation.

In one or more embodiments, the desired collected data points may be scanned or entered into the digital record retention system in real-time during nutplate installation. In some embodiments, the digital record retention system and the heater controller may be combined into a single integrated system. An integrated system combines the heating and installation protocols with the data retention protocols into a single unified system. The integrated nutplate installation and digital record retention system in one or more embodiments may prompt the installation or maintenance technician to scan a barcode or input a serial number during installation or maintenance operations to develop a complete data set for each nutplate installation event.

Depending on the maintenance location or field environment, the heater controller and digital record retention system may be a wall-powered station or a handheld, battery-powered, mobile unit. A battery powered unit may also have corresponding charging station to carry ample supply of charged batteries or power packs to minimize interruptions of maintenance operation.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A nutplate engagement fixture for temporarily securing a nutplate in a system for positioning and bonding a nutplate to a substrate comprising at least one aperture, the nutplate engagement fixture comprising:
   a rigid tube comprising a first section having a first diameter and a second section having a second diameter, the first diameter being greater than the second diameter, wherein
      the rigid tube comprises external threads positioned on the first section, the external threads sized and configured for threaded engagement with internal threads on the nutplate; and
   an elastomeric tube engaged with the rigid tube at the second section of the rigid tube such that the external threads extend beyond the elastomeric tube, the elastomeric tube comprising an elongated tube with an external diameter sized to provide a friction fit with the aperture and retain the elastomeric tube within the aperture, wherein
      the rigid tube is operable to engage the nutplate at one end and extend through the aperture of the substrate, and
      the elastomeric tube is configured to anchor the nutplate engagement fixture at the aperture and secure the nutplate in contact with the substrate.

2. The fixture of claim 1, wherein the second section of the rigid tube comprises an elastomeric tube retention shoulder and the elastomeric tube comprises a retention lip,
   the elastomeric tube retention shoulder comprising a circumferentially disposed lip on an exterior surface of the rigid tube, and
   the retention lip comprising a section of reduced diameter on the interior surface of the elastomeric tube;
   wherein the elastomeric tube retention shoulder is sized and configured to interface with the retention lip of the elastomeric tube such that the elastomeric tube may be fixedly engaged with the rigid tube.

3. The fixture of claim 1, wherein the rigid tube further comprises an internally threaded section.

4. The fixture of claim 1, wherein the rigid tube further comprises an internally threaded section wherein the internal threads have an opposite handedness as the external threads positioned on the first section.

5. The fixture of claim 1, wherein the elastomeric tube comprises an external diameter which varies along a longitudinal length of the elastomeric tube with a flared section proximal an end of the elastomeric tube engaged with the rigid tube, the flared section sized to provide the friction fit with the aperture and retain the elastomeric tube within the aperture.

6. The fixture of claim 1, wherein the elastomeric tube comprises a boss on an exterior face proximal an end of the elastomeric tube engaged with the rigid tube, the boss configured to prevent adhesive migration into threads on the nutplate, under a floating nut element of the nutplate, or into the aperture.

7. The fixture of claim 1, wherein the elastomeric tube comprises thermoplastic elastomer, thermosetting elastomer, or combinations thereof.

8. The fixture of claim 1, wherein the rigid tube comprises thermally conductive material having a thermal conductivity greater than 50 W/mK.

\* \* \* \* \*